United States Patent [19]
Goldstein

[11] Patent Number: 5,410,326
[45] Date of Patent: Apr. 25, 1995

[54] PROGRAMMABLE REMOTE CONTROL DEVICE FOR INTERACTING WITH A PLURALITY OF REMOTELY CONTROLLED DEVICES

[76] Inventor: Steven W. Goldstein, 8901 Burdette Rd., Bethesda, Md. 20817

[21] Appl. No.: 984,120

[22] Filed: Dec. 4, 1992

[51] Int. Cl.[6] .............................................. H04N 5/44
[52] U.S. Cl. .................... 348/134; 359/196; 340/825.72; 455/151.2; 455/4.1; 348/7
[58] Field of Search ................. 340/825.69, 825.71, 340/825.72; 359/142, 145, 146, 148; H04N 5/44; 455/4.1, 151.4, 151.2, 352; 348/734, 7, 10

[56] References Cited

U.S. PATENT DOCUMENTS

| | | | |
|---|---|---|---|
| Re. 33,369 | 10/1990 | Hashimoto | 379/104 |
| 4,475,123 | 10/1984 | Dumbauld et al. | 348/10 |
| 4,567,512 | 1/1986 | Abraham | 348/7 |
| 4,592,546 | 6/1986 | Fascenda et al. | 273/1 E |
| 4,712,105 | 12/1987 | Köhler | 348/734 |
| 4,792,972 | 12/1988 | Cook, Jr. | 380/20 |
| 4,807,031 | 2/1989 | Broughton et al. | 358/142 |
| 4,899,370 | 2/1990 | Kameo et al. | 358/194.1 |
| 4,918,439 | 4/1990 | Wozniak et al. | 340/825.69 |
| 4,959,810 | 9/1990 | Darbee et al. | 340/825.69 |
| 5,001,554 | 3/1991 | Johnson et al. | 348/10 |
| 5,016,272 | 5/1991 | Stubbs et al. | 348/10 |
| 5,033,079 | 7/1991 | Catron et al. | 379/100 |
| 5,046,093 | 9/1991 | Wachob | 380/20 |
| 5,065,235 | 11/1991 | Iijima | 455/352 |
| 5,089,885 | 2/1992 | Clark | 348/7 |
| 5,151,789 | 9/1992 | Young | 358/194.1 |
| 5,206,722 | 4/1993 | Kuan | 348/7 |

OTHER PUBLICATIONS

"Bowser and e on MagicCap Mountain" by Nigel Ballard, Pen Computing Magazine, Aug. 1994.

Primary Examiner—James J. Groody
Assistant Examiner—Jeffrey S. Murrell
Attorney, Agent, or Firm—Pollock, Vande Sande & Priddy

[57] ABSTRACT

A universal remote control device which is programmed to operate a variety of consumer products is disclosed. The device is connected over a bidirectional link to either a cable converter or a telephone interface for receiving programming information. A touch screen display is employed on the programmable remote control device for displaying icons of functions to be selected. By selecting a particular displayed icon, a command can be decoded and sent via an infrared link to one or more appliances. Infrared codes for operating a virtually unlimited number of devices can be supplied to the device over the bidirectional communications link. Further, a provision is provided to permit a telephone connection to be set up between the user's home and a facility advertising products or services over a cable television broadcast. The touch screen display will permit the actual display of these advertisements as messages received from the cable head end system. Orders may be placed from the universal remote control device based on these displayed advertisements.

21 Claims, 25 Drawing Sheets

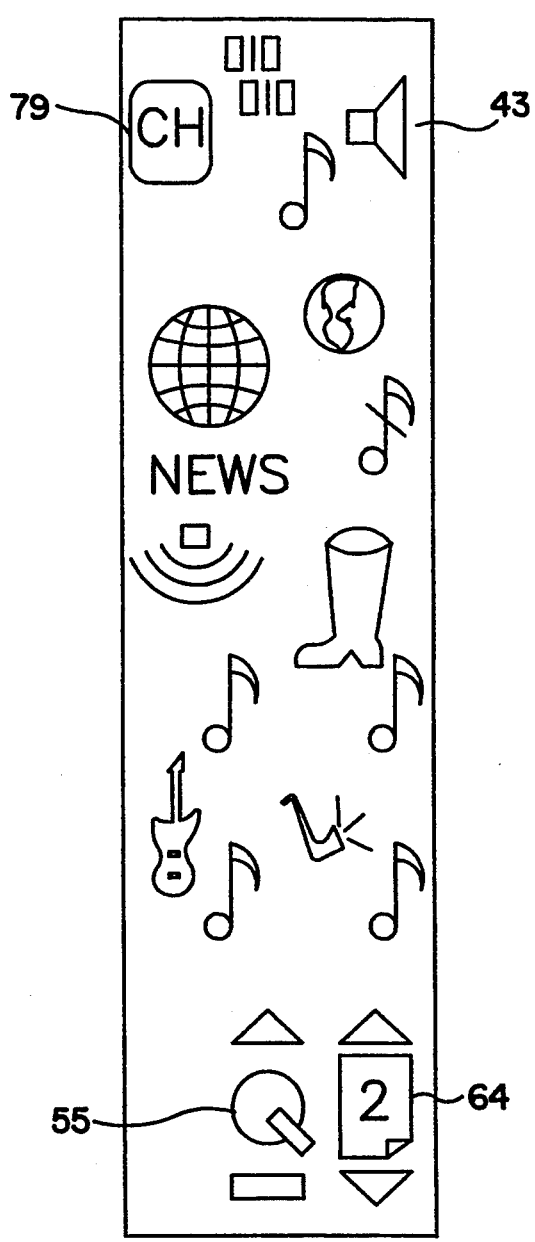
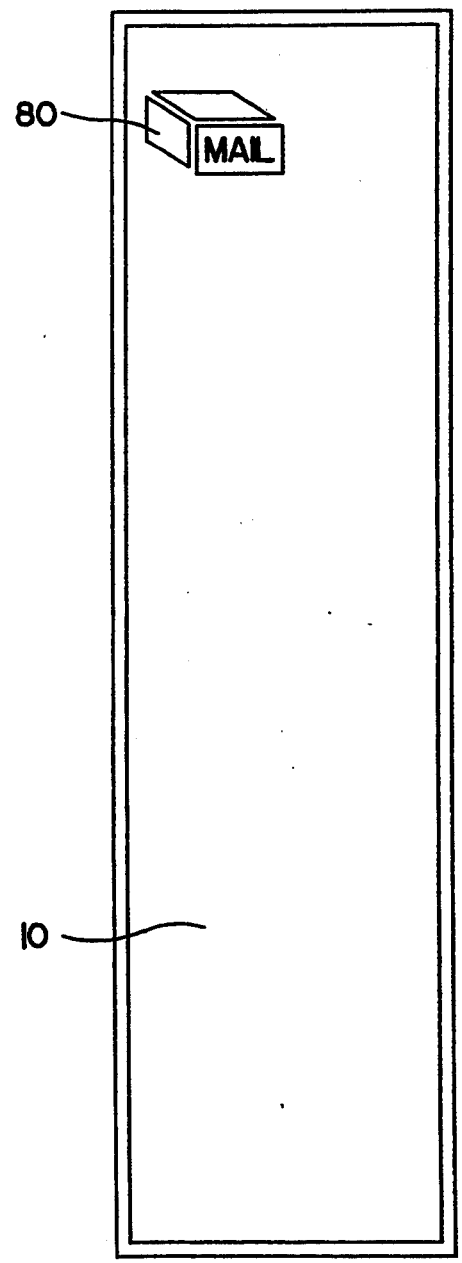
FIG. 3B
FIG. 4

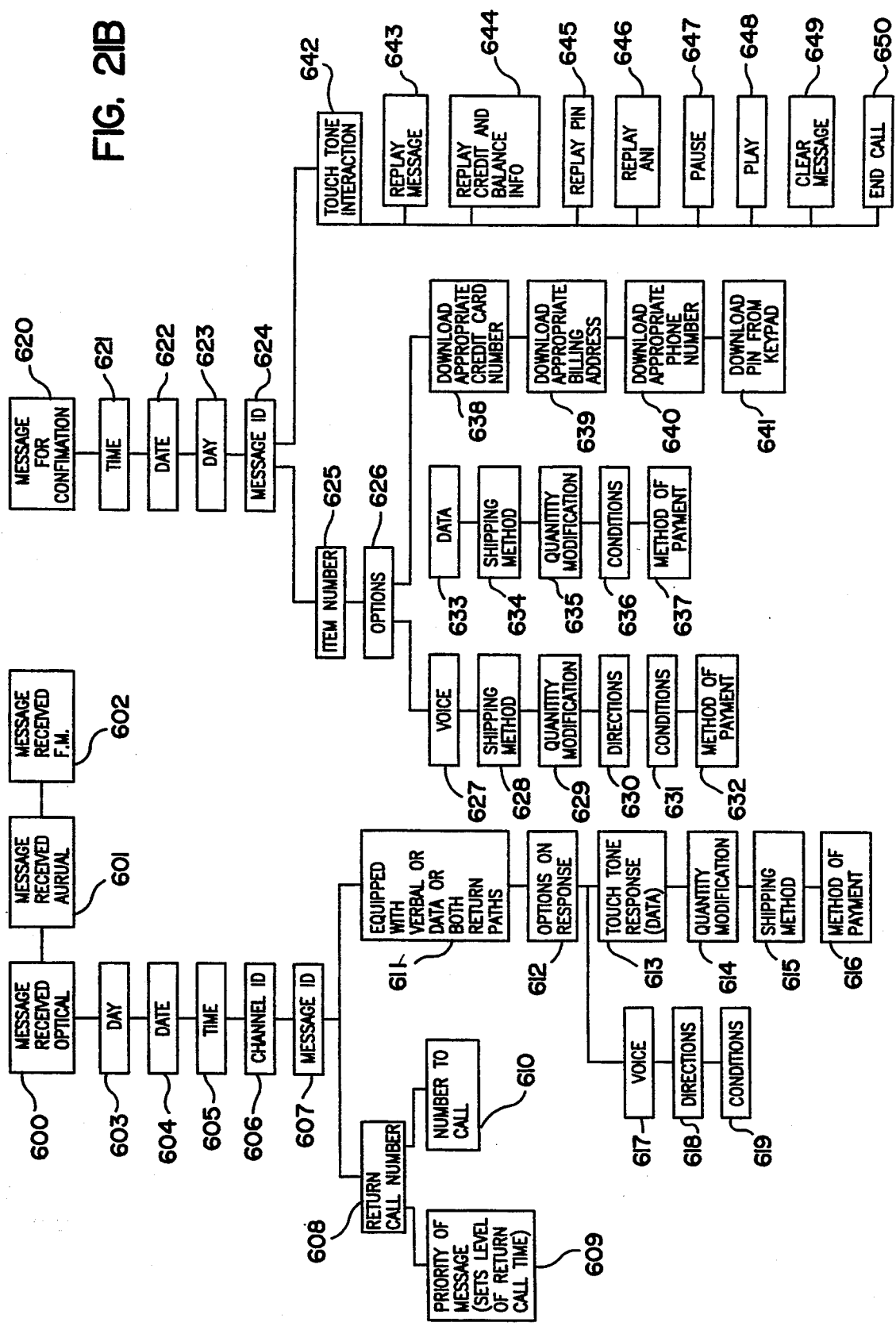

PROGRAMMABLE REMOTE CONTROL DEVICE FOR INTERACTING WITH A PLURALITY OF REMOTELY CONTROLLED DEVICES

The present invention relates to devices which are used to remotely interact with various consumer products. Specifically, a universal remote control device is described which can be programmed to operate a virtually unlimited number of devices and perform functions heretofore unavailable.

Remote control devices which control television receivers have been available to consumers for many years. These devices typically operate by generating an infrared remote control beam modulated with commands for either raising or lowering the volume of a television receiver, changing channels, power up, power down and for operating other more common controls on the television receiver. Additionally, as the homeowner's viewing capabilities have been enhanced through video recording devices, cable television converters and even stereophonic equipment, all of which are remotely controlled, the number of remote control units in the home has proliferated, sometimes making the operation of these devices difficult and confusing. Further, rather than having a standard IR code set for operating all the devices, most manufacturers have their own IR codes, thus making the operation of all units from a single IR generating remote control device difficult.

The proliferation of new consumer products has increased the complexity for the individual user. For instance, the process of programming a video recording device has proved confusing to most consumers when setting the various times and dates for recording the programs which are to be broadcast. As a solution to this problem, programming of the VCR through the IR window has been proposed so that the user need only supply certain digits provided by the programming guides via the infrared remote interface of the video recording device.

The process of teaching a universal remote control device new IR codes for additional consumer products also presents a degree of difficulty for the consumer which is objectionable, and reduces the effectiveness of such universal remote control devices. As a partial solution to this problem, a universal remote control device has been proposed in U.S. Pat. No. 4,959,810. In this device, a telephone interface has been proposed for providing telephone data to program the universal remote control device. Although this reduces to some degree the complexity of learning various codes for operating the various devices, the problem remains in that the control of multiple devices multiplies the number of buttons needed in a single device.

Another difficulty with these devices, which are dedicated to controlling a given number of appliances at the time of manufacture, is reprogramming them to control additional appliances in the consumer's home. Thus, the adaptability of the remote control device for future, yet unspecified products, becomes a disadvantage. Further, as the need for making changes to operating systems contained in these remote control devices occurs, the devices become obsolete. Thus, it would be advantageous to have a device wherein a new operating system could be installed to permit yet other features to be added to the system.

Once the universal remote control device has learned the respective IR codes for controlling appliances within the consumer's home, it may be useful to directly forward data to the remote control device for enhancing the use of the remote control device. For instance, a program broadcast might embed some useful data to either the audio portion or video portion of the signal, which could be downloaded to the user's remote control device, permitting additional functions to be carried out by the remote control device. The data carried by the program broadcast cannot be visible or audible to the consumer, but would be recognized by the remote control device. As a particular use for this feature, VCR programming data indicating the start and stop time and channel for a later broadcast program would be included in the embedded data signal.

The embedded data signal may be captured and decoded by the remote control device. The captured data containing programming information for the VCR may be formulated into appropriate commands for transmission over an IR link from the remote control device to the VCR. In this way, programming of the VCR may be complete with minimal human intervention.

A further use of capturing data embedded in program broadcasts in the remote control device is to assist in the sale of a service or product being advertised. Users of the remote control device wishing to avail themselves of the service or product would capture the data in the universal remote control device. This data would include dialing information for placing a telephone call over the user's telephone to the sponsoring party. An additional data stream can be appended, identifying the user, his address and any pertinent information necessary to complete the transaction with the sponsoring party for the purchase of a service or product, or to obtain other information about the service or product.

Adding these additional functions to a universal remote control device results in the multiplicity of buttons/controls which are necessary to carry out the additional functions. As more remote controlled products enter the consumer's home, the additional functions create a direct increase in buttons/controls necessary to operate these additional devices. Further, dedicated buttons/controls make it virtually impossible for the remote to be updated to control additional devices which are created after the purchase of the remote control device. Therefore, it appears necessary to provide a display for permitting linked menu selections to be presented to the user which will simplify the use of the device.

A display which is capable of providing these menus would also permit the display of advertisements for products and services for sale. The displayed advertisements may also include data associated therewith for placing a call to the sponsoring party, ordering a product or service. The remote control device, through its telephone interface, creates the required dialing digits necessary data for completing the transaction with the sponsoring party.

The universal remote control device may also operate in a two-way mode with a cable system converter over a bidirectional communications link. Messaging may be accomplished between the cable system operator and the individual remote control units, either on an addressable or all call basis, and as a further option, data may be uploaded from the remote control device back to the cable head end system, via the telephone link.

The present invention is directed to a universal remote control device which is capable of obtaining all the foregoing features. As these devices would in themselves becomes valuable consumer products, additional security provisions are provided such that the remote control device, once obtained legitimately, cannot be used on another cable system without authority of the cable system. Further, the owner of these devices would be protected from unauthorized use on such additional cable systems, given the security features included therein.

SUMMARY OF THE INVENTION

The present invention provides for a universal programmable remote control device which may be used by a consumer for controlling a variety of consumer products. The programmable universal remote control device is bidirectional in that it can receive data for programming the device through an interface as well as issue commands over a communication link to one or more devices to be controlled. The programming of the device is carried out by connecting it through the interface means to a source of programming information. The interface is designed to be connected to a remote source of programming and receives all necessary operating codes from the remote source. Thus, the user need not perform any elaborate programming steps for the remote control device.

Personalizing the device operation for each household can occur either through a bidirectional communications link to a cable television converter which receives programming code from a head end cable facility, or by a telephone coupler which is connected via a telephone link to a programming source. Once connected to the remote data source, programming occurs by simply activating a control when programming information is known to be entering the interface of the device. In a preferred embodiment of the invention, wherein the programmable universal remote communicates via a bidirectional communications link with a cable television converter, connected to a source of cable television signals, the cable system head end downloads programming to the universal remote control device, as a service to its subscribers.

The universal remote control device, in accordance with a preferred embodiment, includes a touch screen display which will display icons representing the various services for which the user has subscribed. In this way, the head end facility can control the selections made by the user, based on the services for which a contract has been obtained.

The preferred embodiment also provides for display advertising initiated from the head end system, or from a telephone connection source on the touch screen panel. Thus, the user, upon activation of the remote control device, will see various advertisements displayed for his consideration.

The device can be used to control not only channel selection and functions for the cable television converter, but may also control the VCR, stereo, compact disc player or other remote controlled device. As it is recognized that consumers would have a variety of such devices, all made by different manufacturers, and each requiring a different infrared (IR) code, the subscriber can receive these different codes from the head end cable facility as part of that facility's device programming service. Alternatively, the device may be programmed at the point of sale or via a telephone coupler to a remotely connected programming source. Additionally, user-friendly icon characters for display on the touch screen display will be forwarded to the programmable universal remote, to identify the functions which are subject to control.

The preferred embodiment employing the touch screen display is capable of producing a series of icon menus, all linked together, so that a user may easily scroll through layers of the various functions and select a particular device and/or programming service.

The programmable universal remote control device is capable of other functions. For instance, an Order Out feature may be added to the universal remote control system. By including a telephone interface, either as part of the cable television converter, or as part of the customer's telephone system, it is possible to place a call to respond to an advertisement displayed on the user's television receiver or the touch screen display. Preferably, the digits of the vendor's telephone can be stored in the remote control system. Upon command selection made on the universal remote control device, a command is sent to the telephone interface to establish a phone connection with the service provider, i.e., fast food delivery service, etc. This phone connection will permit an order to be placed for the particular product being advertised.

In yet another feature of the device, an advertisement for a future broadcast can contain imbedded therein a digital message identifying the date, time and channel number associated with the future broadcast. An optical detector included in the programmable universal remote control device can sense the imbedded message as luminance modulation contained on certain lines of the video signal. In the case of a premium broadcast, this data information can then be used to download, via an IR link, data for programming a video tape recorder to record the future event. Additionally, the event may be ordered at that time by supplying data back to the cable television converter, indicating that the event has been selected for recording. During off-hours, the cable system can poll the various consumer cable television converters to obtain the identity of those subscribers electing to view or record the forthcoming broadcast.

The optical sensing of data buried in an advertised broadcast may also be used to facilitate product-ordering. By detecting the data message buried in a video signal used to advertise a product, the phone number for the vendor supplying the product may be decoded and retained in the remote control device. A phone connection can then be established between remote control system and vendor. A digitized voice message may identify the purchasing party to the vendor so that the order can be completed. This identity can also be verified by the vendor using caller ID equipment.

The universal remote control device may be used with a cable converter box which has numerous security features associated therewith. For instance, the television converter may be programmed only to respond to a specific universal remote control device. A unique identification number assigned to each remote control device is downloaded from the head end cable system to the cable converter box. Only a remote control device which has an ID number verified by the cable TV converter will be able to control the cable TV converter.

The cable converter may also personalize the remote to a specific location. If the user has two remotes in his household, one may be assigned to a converter in the bedroom, while another may be assigned to the family room. By connecting the remote control device through a connector to the cable converter, the cable converter may download a second ID received from the cable system, identifying the remote as belonging either to the bedroom or family room. Thus, each time the user wishes to verify the room for which the remote has been personalized, he may press an ID icon on the touch screen and identify the location for the remote control device.

The security features employed in the cable television converter permit the converter to be personalized for any cable system, and for any class of user. The cable operator may command the cable converter to place a telephone call back to the head end system at any time. Using caller ID verification, the cable system operator may pinpoint the particular address of the cable converter which is responding.

A personality register associated with the converter receives a service identifier which identifies the particular cable system for which the converter was to be operated. If a set top converter from a compatible but different cable system is introduced, it will not recognize the service identifier and any of the messages being transmitted from the head end. This prohibits the set top cable television converter from operating in to another location and attached to another cable system without authorization.

If power is disconnected from the cable television converter for more than a predetermined time interval, the cable television converter is disabled and must be uploaded with new cable data. When the converter is initially configured, information is stored therein, identifying the cable system operator and the channel and location within the vertical blanking interval where data is being transmitted to restore its use. If the box has been moved to another cable system, the channel number and line number for obtaining the personalized data will most likely not be correct for the second cable system. Additionally, the cable system identification number will not agree with the identification number of the second cable system.

DESCRIPTION OF THE FIGURES

FIG. 3B illustrates yet another linked menu of music preferences which may be selected from the touch screen display.

FIG. 4 shows a menu screen which indicates mail is waiting for the user.

FIG. 21B illustrates the telephone transaction preparation from embedded signal data.

DESCRIPTION OF THE PREFERRED EMBODIMENT

Figure 1:
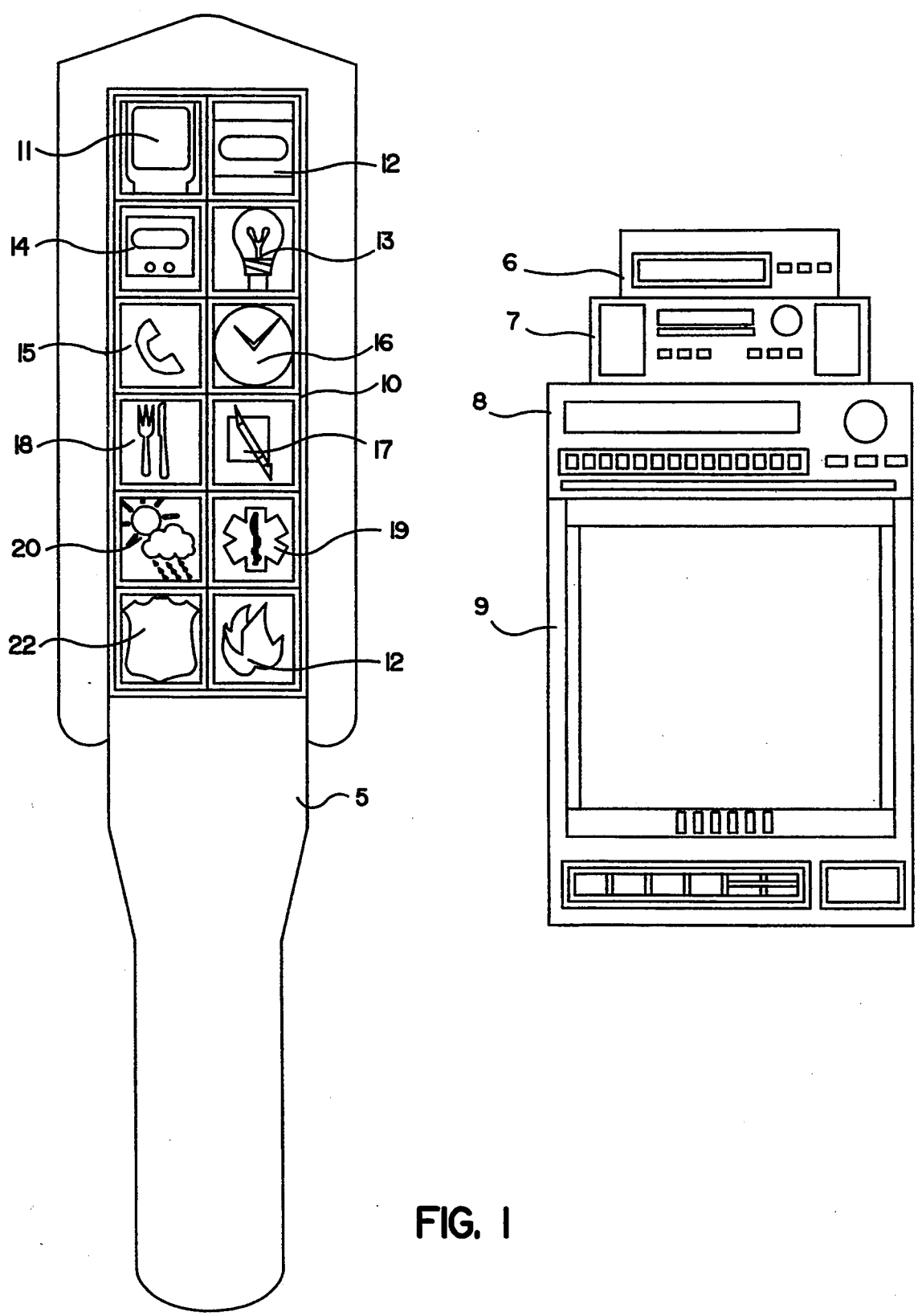
FIG. 1 is a plan view of a remote control device and a plurality of appliances under control of the remote control device.

Referring now to FIG. 1, there is shown a universal remote control device 5, in accordance with the preferred embodiment, which controls a plurality of devices 6, 7, 8 and 9. Devices 6, 7, 8 and 9 include a cable television converter 6, a video tape recorder 7, a stereo receiver 8, and a television receiver 9, which are in turn usually controlled via an infrared remote control signal. The remote control device 5 will generate infrared codes for each of the devices 6, 7, 8 and 9, even though each of the devices 6-9 operates with different infrared codes selected by the different manufacturers of each of the devices 6-9. In the preferred embodiment of the invention, the programmable remote control device 5 includes a touch-sensitive screen 10 which displays a plurality of icons 11-23. As will be evident with respect to the block diagram for the remote control device 5, the remote control device 5 includes a microprocessor system which is capable of generating a plurality of icons 11-22 for display on the touch-sensitive screen.

The user can select a number of commands for execution by the microprocessor remote control device 5 by touching the icon representing the device under control. Icon 11 represents a selection to control the cable converter 6. The icon represented in 12 will permit control over the stereo receiver 7. As will be evident from Figures yet to be described, the selection of these icons will provide a linked menu for display on the touch-sensitive screen 10, permitting control functions for the devices 6-9 to be displayed and selected.

Other icons displayed on the touch-sensitive screen of FIG. 1 include an emergency police command selection 22, an emergency fire company command 21, a weather channel viewing dedicated command 20, an order out feature 18, a mute command 17, a real time clock 16, a telephone call placement 15, a personal calendar 14 and an auxiliary control 13 for controlling yet other devices which might be infrared-controlled in the future.

Figure 1A:
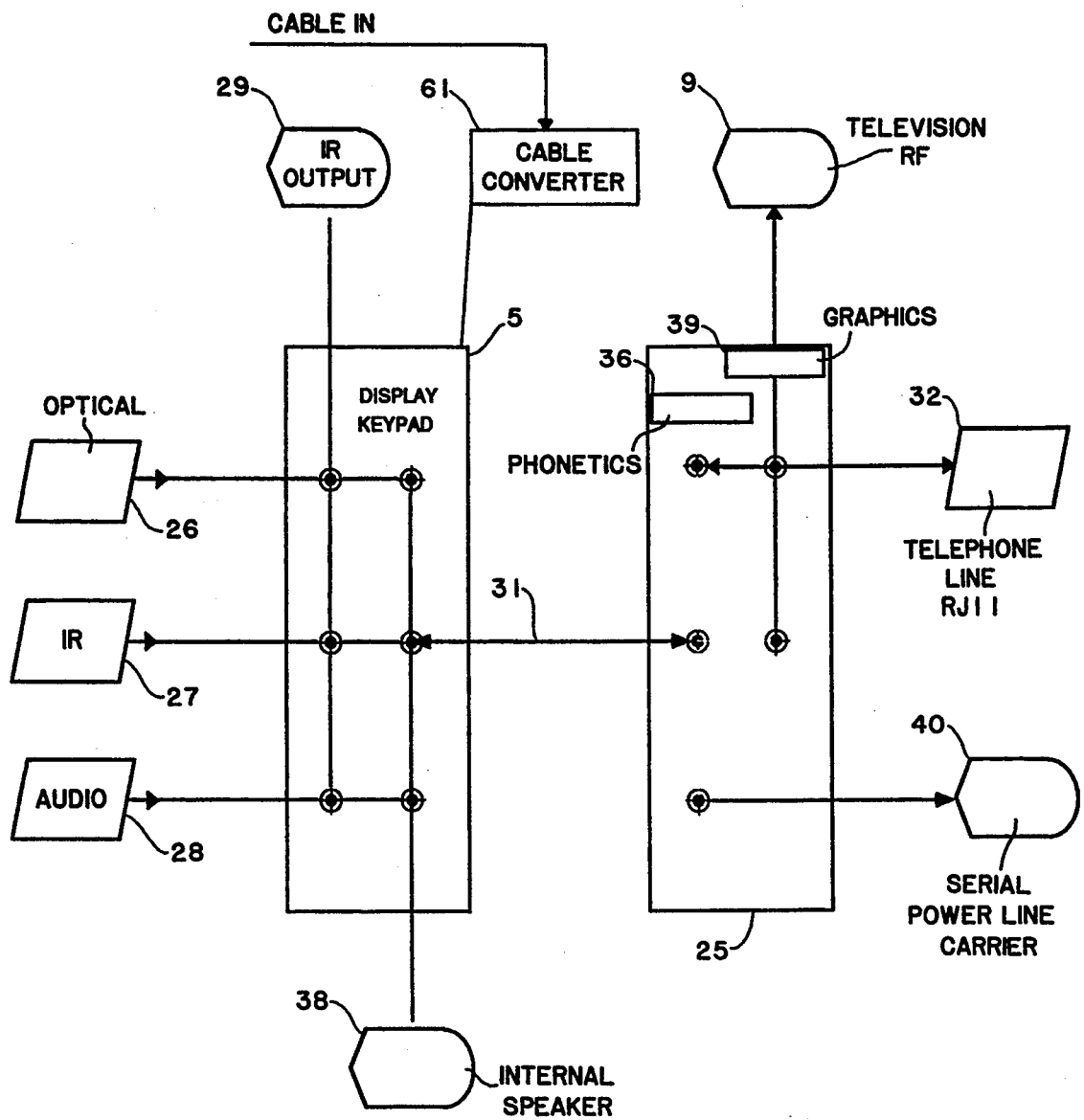
FIG. 1A is a block diagram of the remote control system of FIG. 1.

FIG. 1A is a system block diagram illustrating the remote control device 5 as it interfaces with the cable converter 6, and a telephone interface 25. The remote control device 5 of FIG. 1A includes three input ports comprising an optical input port 26, an IR signal input port 27 and an audio input port 28. An FM bidirectional communications link 30, 31 links the cable converter 6 and telephone interface 25 with the remote control device 5. A keypad selection device associated with the remote control device 5 permits manual entry of selection information as will be described with respect to the preferred embodiment. Remote control commands are transmitted to the controlled devices of FIG. 1 via the infrared output port 29.

As can be seen from FIG. 1A, data can enter the remote control device 5 through any of multiple input ports 26, 27 and 28. Additionally, data can be conveyed via the bidirectional link to/from the telephone interface 25. Further, the telephone interface 25 can transfer data from the telephone line 32 to and from the remote control device 5 via the FM bidirectional communications link. A phonetics generator 36 may compose audio messaging for transfer to the remote control device which will be signalled to the user through the internal speaker 38 of the remote control device 5.

The various input ports 26, 27 and 28 provide a capability of transferring embedded data in a television broadcast to the remote control device. The function of this data, as will be explained with other features of the invention, can be to control video tape recorders, provide information for ordering services and products, and for any general data transfer necessary to the remote control device.

No matter which of the data ports data is received into the remote control device 5, the data has generally the same format. IR codes for operating the remote controlled devices of FIG. 1 may be uploaded to the remote control device, data for configuring icons on the LCD display may be received as digital data, and stored in a memory of the remote control device 5 for effecting display of various icons on the display.

Sound byte information may also be received in either of these ports which will be broadcast as an audio message over an internal speaker 39 of the remote control device.

As the remote control device 5 cooperates with the telephone interface 25, various pieces of information can be transmitted via embedded data to the remote control device, and communicated to the telephone interface 25. For instance, phonetics information may be included in the embedded data which, when transferred via the bidirectional communications link to the telephone interface, results in an audio message being composed at the telephone interface 25 and retransmitted to the remote control device 5. Further, video menus for display on the television receiver via the display generator 39 of the telephone interface may also be transferred via this embedded data to the telephone interface 25.

Telephone instructions may be included in the embedded data for placing an outbound call over the telephone interface. The outbound telephone call will constitute an interactive system wherein the message is composed by the telephone interface containing data received by the remote control device may be routed to the correct telephone number, which is also received by the remote control device as embedded data.

Modem data may be contained in the embedded signal. The modem data will be used to configure a modem in the telephone interface such that it can receive menus and other information from a data base service which is connected to the local area network.

The phonetics generator 36 will operate on data of the embedded signal which has been forwarded from the remote control device 5 to generate audio messages for retransmission via the bidirectional link to the remote control device 5. The video menu information is set up in accordance with the video menu's control data received in the embedded signal. The menus are in turn constructed from data received via the telephone interface for display as a television output signal on television 9.

The cable converter may also receives menu data, icon data and other information for operating the system. The cable data for displaying a menu on television 9 is transferred via the IR link to the telephone interface 25 which contains the video graphics generator 39.

A serial port 40 on the telephone interface will permit control data transferred from the remote control device to operate other devices.

The microprocessor operating system for the remote control device 5 will generate a series of linked menus depending on a selection made from the screen shown in FIG. 1.

Linked Menus for Remote Control Device

The link menu system employed in the microprocessor system of the remote control device 5 presents to the user different levels of control selections. If the user touches the icon 11, representing television service, the touch-sensitive screen 10 will display the linked menu screen of FIG. 2A. This screen displays at the top the television icon 11 indicating that the selected mode is television reception, and presents the numbered channel selections as the familiar key pad format 42 familiar to users of remote control devices 5. Thus, a channel can be selected by touching its one, two or three decimal digit representation.

The remote control device will issue an infrared command for selecting the channel on the cable converter 6 via a conventional infrared communications link.

The icon 43 representing a speaker is used to send a mute command via the infrared signalling path to the cable converter 6. A navigation symbol 46 is shown which will permit the scrolling of a curser on a TV menu for television 9, generated by the graphics generator 39 of FIG. 1A.

Figure 2A:
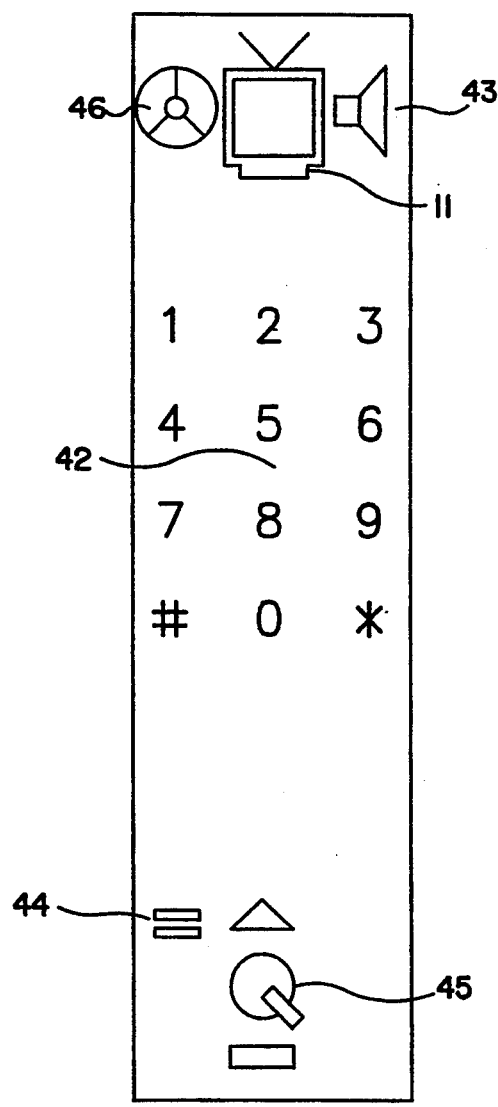
FIG. 2A illustrates a first screen presented on the touch screen of the remote control device of FIG. 1 for controlling a cable converter.
Figure 2B:
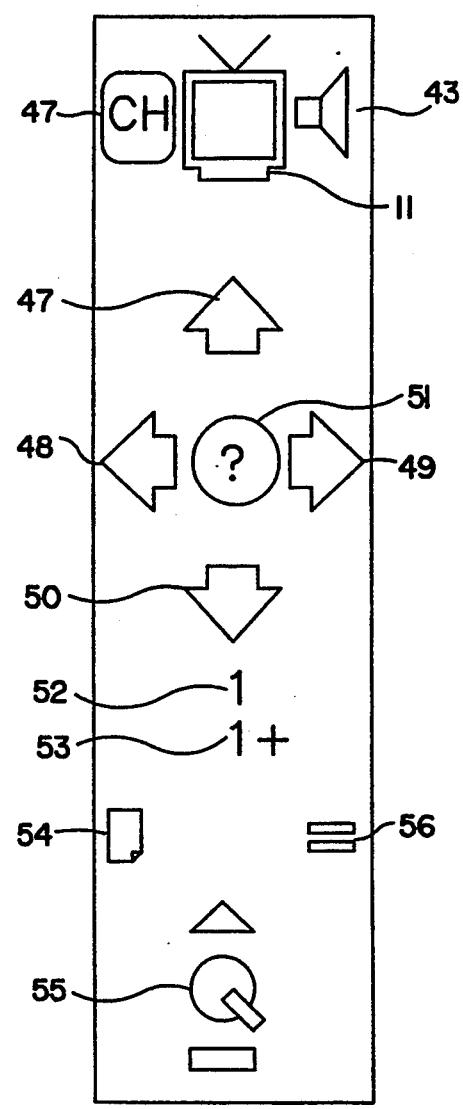
FIG. 2B illustrates a second linked screen for controlling the cable converter in accordance with subject matter identified with specific channels.

The user selects the navigation symbol 46 by touching the icon 46 being displayed on a second sub-menu shown in FIG. 2B. This second sub-menu screen provides for a display useful for moving a cursor upwards, downwards or left and right on the television screen. The four arrows 47, 48, 49 and 50, indicate a direction of movement for the cursor when the respective arrow is touched. Centrally located with respect to the four arrows is a display icon 51 which, when touched, sends an IR command to the television menu graphics generator 39 in FIG. 1A, requesting that the highlighted items be displayed. The subsequent display of the highlighted item on the television receiver 9 will indicate pertinent facts about the selection.

Other commands which may be issued when viewing the screen of FIG. 2B include a record function. Selection of the record function by touching the icon 52 will result in data associated with the highlighted event by the cursor being downloaded to a device for controlling the VCR 7 at the consumer's location. The downloaded data will program the VCR 7 to operate at a time associated with the highlighted feature. As can be understood from reference to U.S. Pat. No. 5,151,789, of Insight Telecast, programming of a VCR in response to a menu selection, is well within the skill of those skilled in the art.

A second record icon 53 with a plus sign associated therewith, will permit multiple recordings of the selected event depending on the number of times the button has been touched. Thus, a feature appearing daily can be selected for recording in four to five consecutive days, if so desired by the user.

Figure 2C:
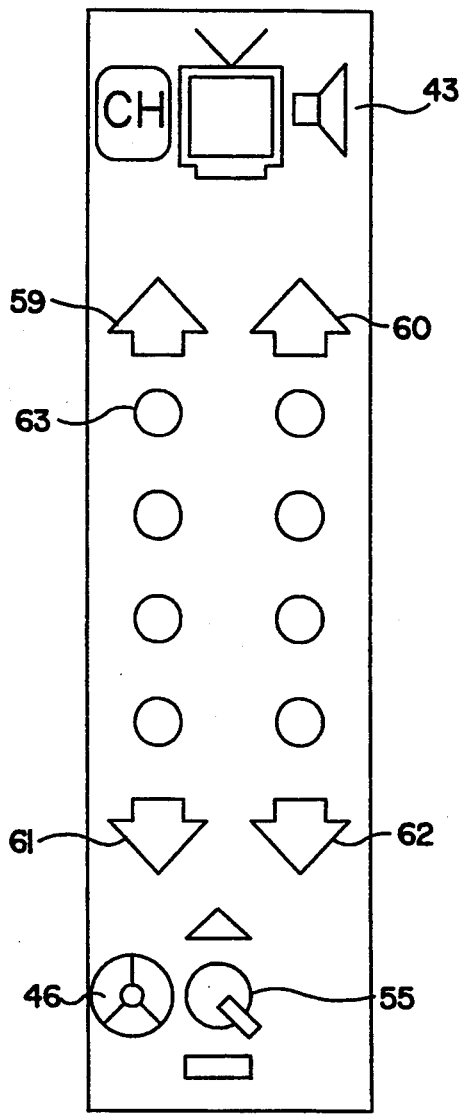
FIG. 2C illustrates another linked screen for illustrating functions which may be selected to control a cable converter.

The menu shown in FIG. 2C is also linked to additional sub-menus. By selecting the bottom-most icon 55 of the touch-sensitive screen brings up the menu of FIG. 2C, the quiescent television operating screen. The screen of FIG. 2C includes a left and right hand set of arrows 59, 60, 61 and 62 separated by four icon positions 63. The leftward-most set of arrows 59, 61, controls volume and the right-most set of arrows 60, 62 controls channel selection. As channels and volume are moved up and down, respective icons between the pair of arrows are displayed at positions 63. Navigator icon 46 is also presented to return the user back to FIG. 2B. Selection of the channel icon CH will bring the user back to screen 2A. The icon 55 to the right of the navigator icon 46 will turn the user to the next linked screen.

Other sub-menus may be accessed by the user to permit selection of favorite channels or channels which are dedicated to certain programs. As the classes of service subscribed to by users may vary, it is possible to reconfigure the remote control device 5 to display only those icons associated with the individual subscriber services via the two-way communications FM communications link 31.

Figure 2D:
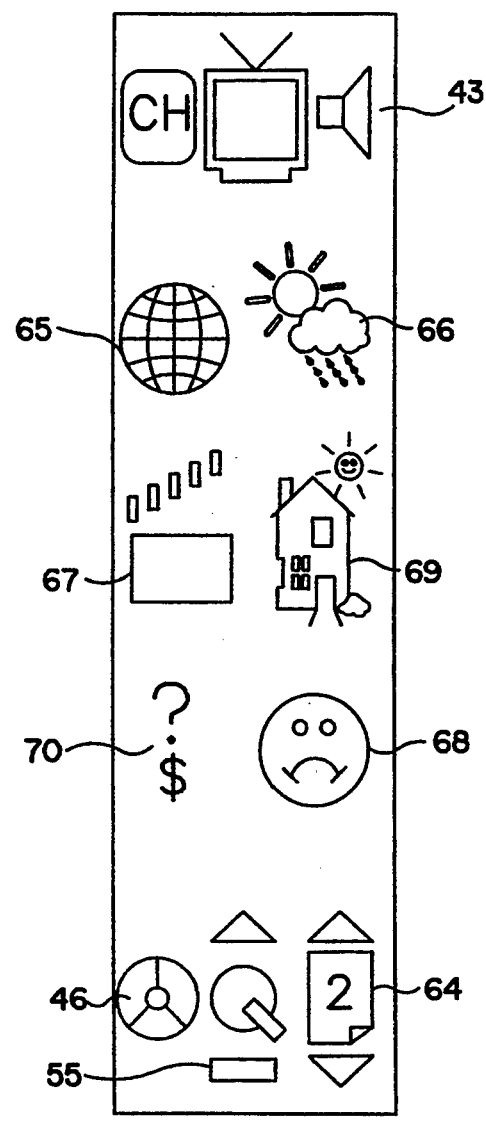
FIG. 2D shows another linked menu for illustrating channel selections by program categories.

Access to these other menus which provide for channel selections made from categories of programs are obtained by first accessing the menu of FIG. 2A. Selecting the function represented by the icon 45 will take the user to the first menu shown in FIG. 2D which identifies these categories.

The lower right hand icon 64 indicates that there are two screens associated with the menu of the television control mode. The screen presents channel selections which can be made by pressing the particular icon representing a category of program to be viewed. The first of these categories is shown to be NEWS PROGRAM 65 which when selected, will result in screen 2C being displayed. Screen 2D will permit selection to be made only among channels which are news channels.

Similarly, an icon 66 is shown on screen 2D representing a weather channel which, when pressed, will also generate screen 2C. Channel selection made from screen 2C will only tune to channels dedicated to weather broadcasting.

Other dedicated channels include an icon 67 representing a movie channel, an icon 68 representing children's TV, and other icons 69, 70. The navigator icon 46 of the screen shown in FIG. 2A is also presented.

Thus, it can be seen that in effecting operation of the cable converter 6 for viewing television programs, various linked menus may be provided by the microprocessor operating system of the remote control device of FIG. 1.

The remaining icons 12–22 shown in FIG. 1 may be used to link to other screens for selecting devices for operation. Specifically, the icon 12 representing operation of stereo equipment may be selected to present the screen of FIG. 3.

Figure 3:
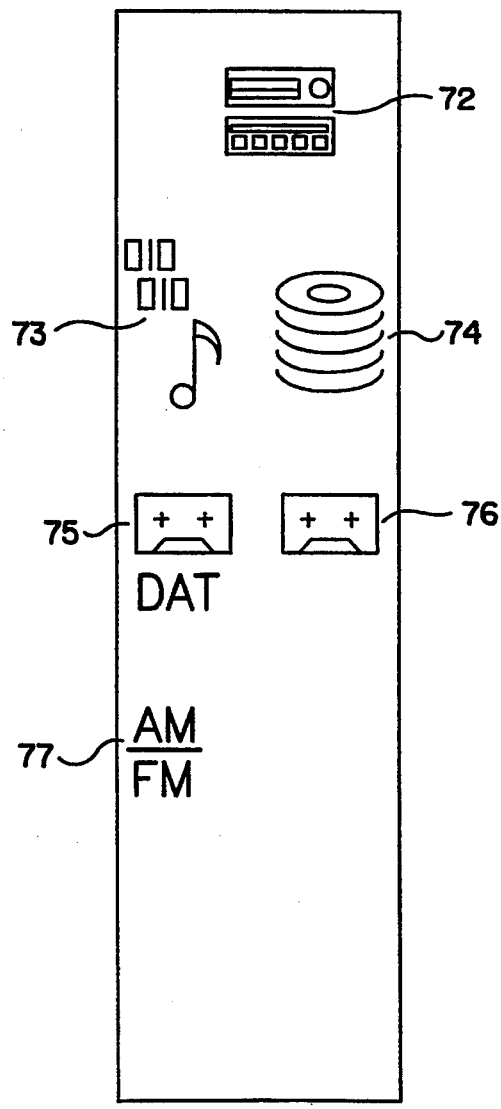
FIG. 3 illustrates another menu screen displayed by the touch screen display for controlling audio products.

The displayed screen of FIG. 3 includes the icon 72 illustrating that stereo control function has been selected. A plurality of additional icons 73–77 are presented representing additional audio sources in the user's home. Icon 74 represents a compact disc changer which can be operated from infrared commands. A digital music source is indicated by icon 73. Similarly, a digital audio tape device is represented by icon 75, a cassette deck is indicated by icon 76 and an AM/FM receiver is indicated by icon 77. As these devices are controlled by infrared commands, the microprocessor operating system will issue the appropriate infrared command for operating each of the devices.

Figure 3A:
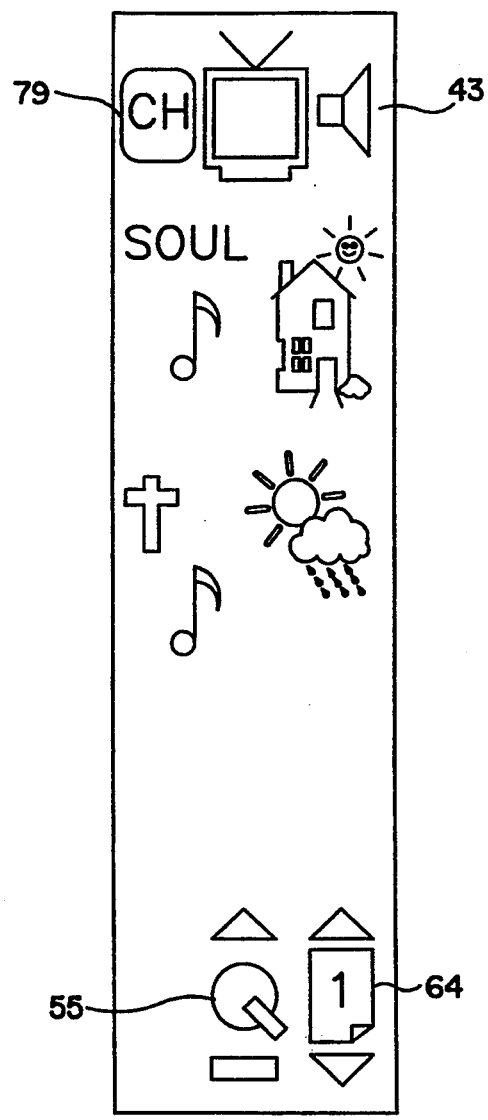
FIG. 3A illustrates a linked menu for selecting music styles for listening, in accordance with subject matter categories.

The icons represented in FIG. 3, when selected by touching, will link to a second menu to provide for specific commands for operating the selected device. FIGS. 3A and 3B indicate the selection of the digital music icon 73, the first screen of which is shown in FIG. 3A.

As can be seen, these icons shown in 3A represent different music styles. Direct access of digital music channels may be selected by touching the icon 79, which present a second linked menu similar to the television direct access menu of FIG. 2A. A mute control is also indicated icon 43. Screens 1 and 2, identified by icon 64, represented in FIGS. 3A and 3B provide for specific selections of program content by offering various categories of digital music programs for selection by the operator. The icons of FIGS. 3A and 3B represent various categories of program content, such as country-western, classical, soul, rock and roll, etc.

The number of selections provided is virtually unlimited, and further description of the various available selections will not be provided.

The foregoing linked menus present the operator with a convenience in choosing among various entertainment media and selections within the entertainment media.

A touch screen associated with the remote control device has additional features to be implemented. For instance, the full display screen can be used to display advertisements, such as shown in FIGS. 6, 6A, 7, 7A, 8 and 8A downloaded from the cable TV head end via a two-way communications link linking the remote control device and cable converter. As will be evident from the block diagrams representing the cable converter 6 and universal remote control device 5, messages relayed to the set top converter 6 from the head end cable facility may be downloaded to the remote control device for display.

Figure 5:
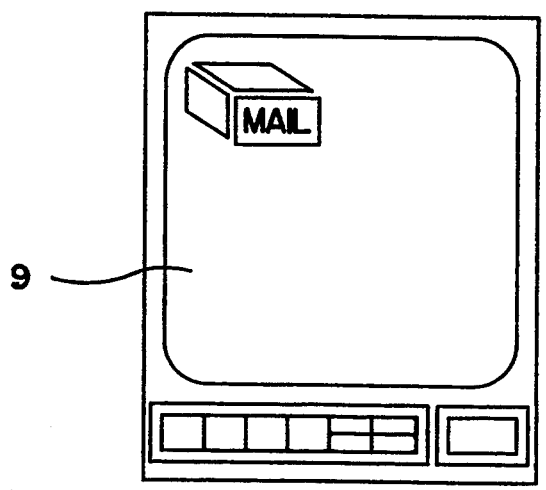
FIG. 5 shows a display on the television receiver for indicating to the subscriber mail is present.
Figure 6:
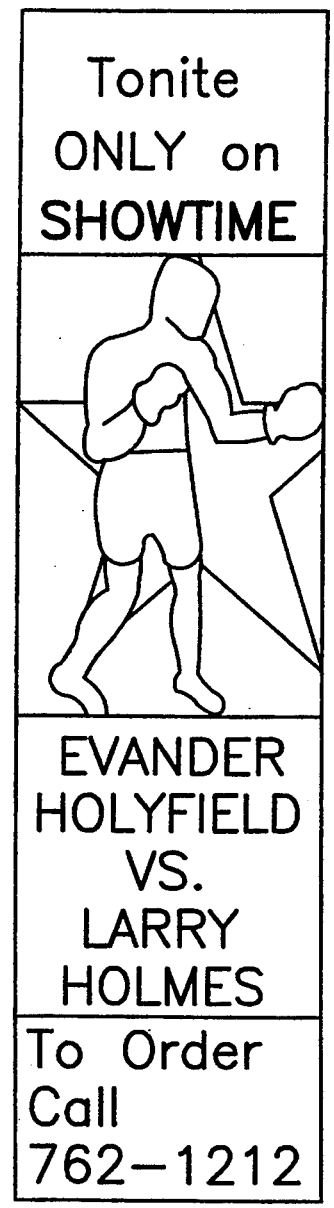
FIG. 6 illustrates a first advertisement which may be displayed on the touch screen display of the remote control device which originates from the cable head end system.
Figure 6A:
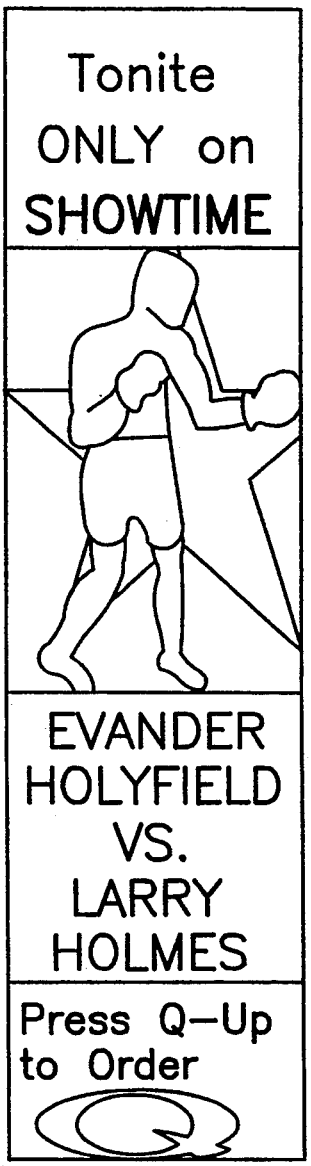
FIG. 6A is another type of advertisement which may be displayed on the remote control device.
Figure 7:
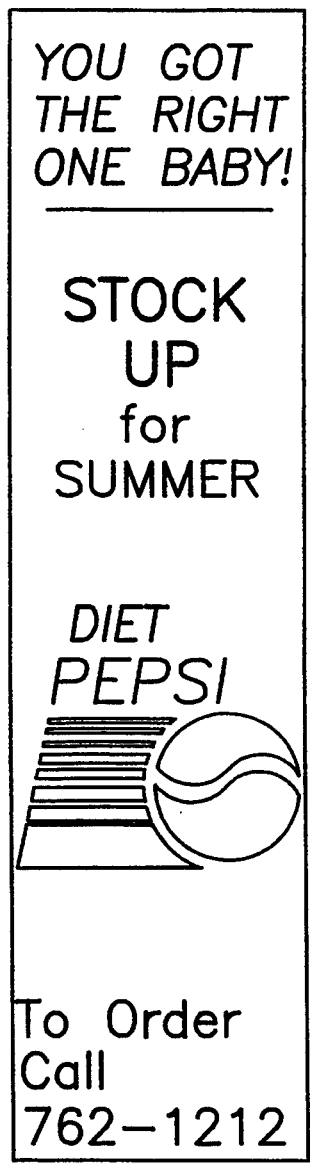
FIG. 7 shows another type of advertisement for a commodity vended by a local vendor, displayed on the touch screen of the remote control device.
Figure 7A:
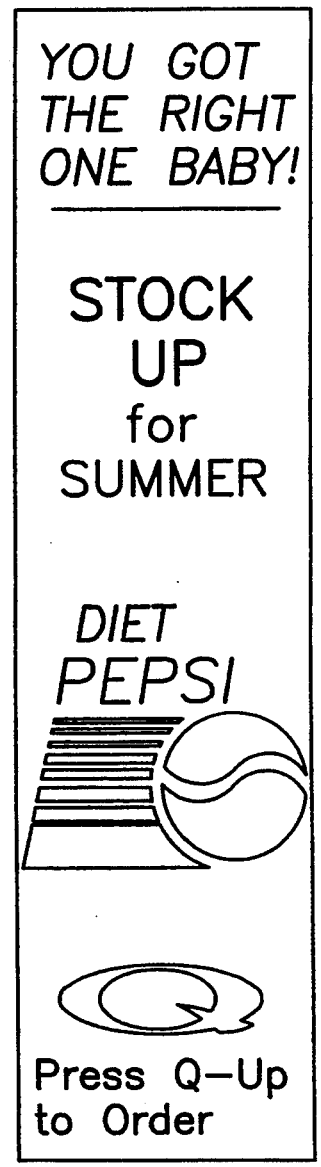
FIG. 7A is yet another type of advertisement which may be shown on the remote control device.
Figure 8:
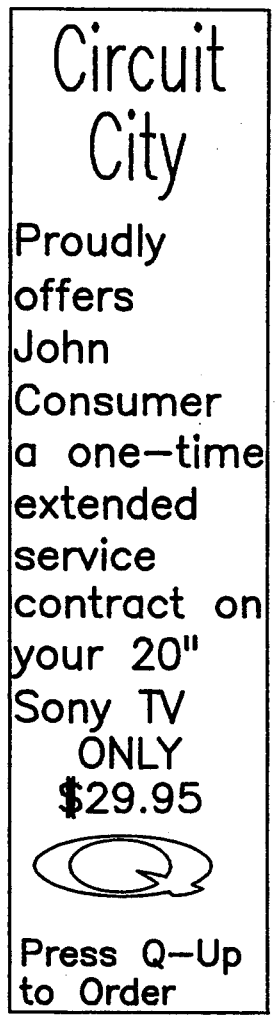
FIG. 8 is yet another example of advertising originating with the head end system of a cable television network for display on the touch screen display of the remote control device.
Figure 8A:
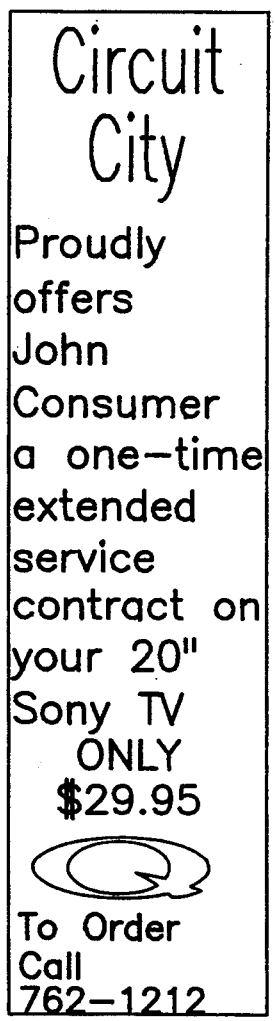
FIG. 8A illustrates another advertisement which may be displayed on the touch screen display of the remote control device.

The displayed messages represented in these Figures are preceded by an indication shown in FIG. 4 on the remote control touch panel display 10, and a corresponding indication on the television receiver display of FIG. 5, that mail is available for display. Mail, represented by the icon on FIG. 4, as well as a corresponding image in FIG. 5, tells the user that messages have been downloaded from either a cable head end system or other source of program delivery service to the set-top converter or its equivalent. By selecting the mail icon 80 of FIG. 4, the FM bidirectional communications link will transfer the message for display from the cable converter to the universal remote control device for display on the touch-sensitive screen 10.

Thus, any of the displays of FIGS. 6, 6A, 7, 7A, 8 and 8A, when received as a data message, can be displayed upon command by the user.

Figure 9:
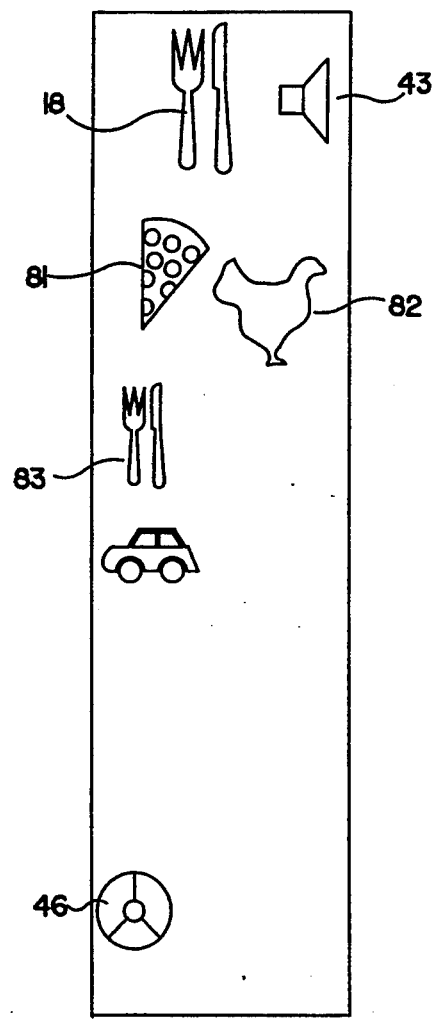
FIG. 9 illustrates a further menu for display on the touch screen display of the remote control device.

Yet another feature associated with the remote control device in accordance with the preferred embodiment is an order-out feature represented by the knife and fork icon 18 of FIG. 1. This icon, when selected, will generate an order-out menu as shown in FIG. 9. When the ordering function represented by this icon is selected, a screen is presented to the user with the various categories of products, such as pizza 81, chicken 82 and 83, which can be ordered. Various vendors of such commodities as fast food may be displayed on the touch screen panel and a selection displayed thereon selected by the operator. When the selection is made by touching the corresponding icon on the touch screen, the universal remote control device will signal the telephone interface 5, via the bidirectional communications link to establish a telephone call with the vendor. Once a telephone link is established with the vendor offering the commodity a digital encoded voice module within a wall module or at the converter instructs the vendor as to the specific buyer identity and location for delivery of the order. The navigator icon 46 is also shown permitting scrolling among menu selections displayed on the television 9.

The ordering out system provided for by the universal remote control device and a corresponding telephone interface does not impose any significant hardware or facility overhead from the vendor processing the telephone call. Once the call is placed from the user's home, an ordinary telephone link is established with the vendor. In the event the vendor has not correctly clearly received the order, he can, using conventional DTMF signalling, request the user telephone interface to repeat the message. This simple protocol requiring only DTMF tones to be exchanged by the vendor, is controlled by the vendor without any additional overhead, relying entirely on the user's equipment for implementation.

Figure 10:
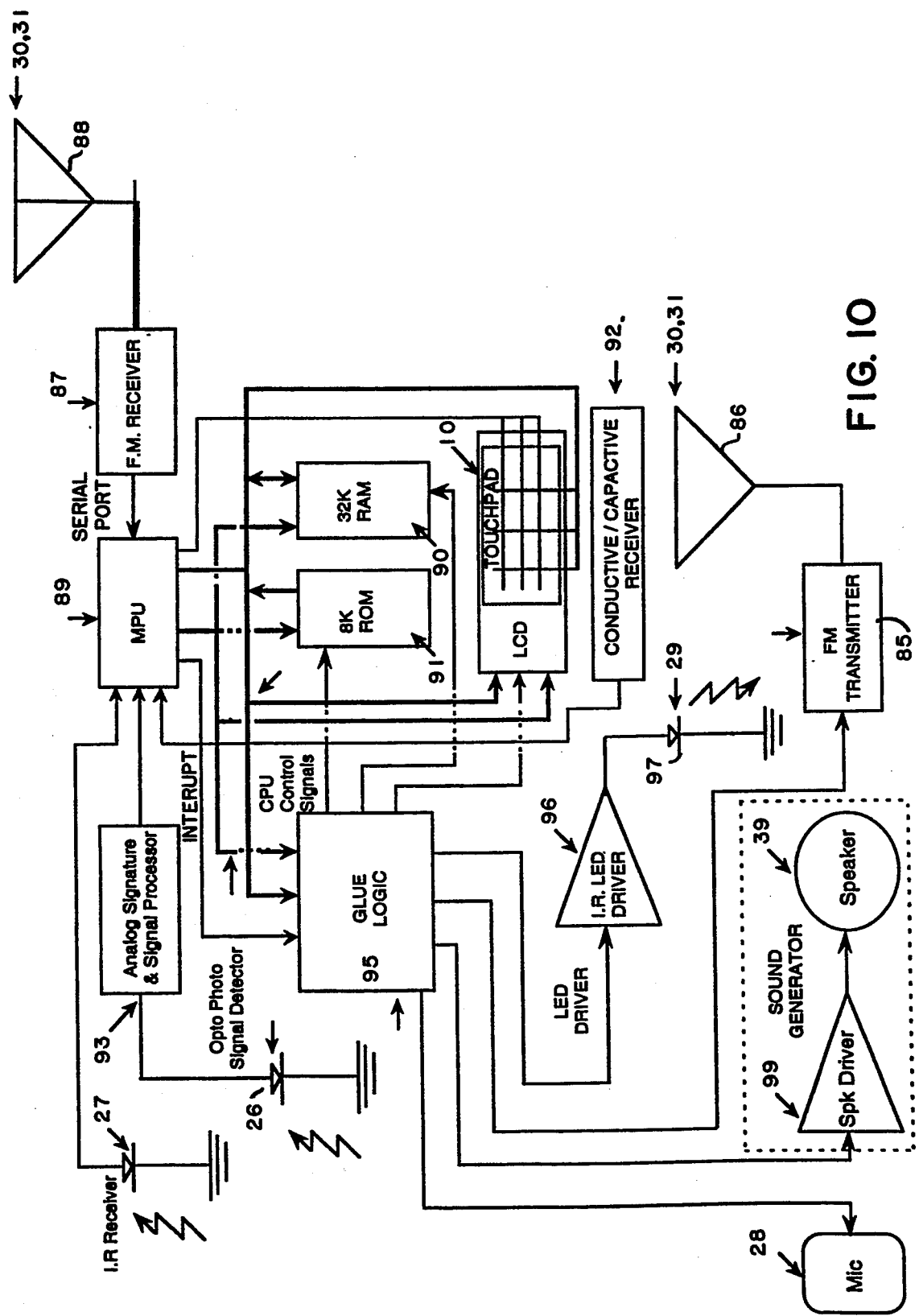
FIG. 10 is a block diagram of the universal remote control device in accordance with the preferred embodiment.

Referring now to FIG. 10, there is a block diagram of the remote control device shown in FIG. 1. The universal remote control device is coupled via a bidirectional communications link 30 with the cable converter of FIG. 14. The bidirectional communications link shown in FIG. 1A comprises a frequency modulation transmitter 85, antenna 86, 87, antenna 88 and a frequency modulation receiver. The antennas 86 and 88 may be the same antenna, coupled through a common hybrid or diplexer to separate the transmit and receive signals.

The bidirectional communications link 30, 31 permits data that is received from the program origination facility to be transmitted from the cable converter 6 to the universal remote control 5. Thus, advertising messages, a complete operating system, infrared codes for operating the various equipment in the consumer's home, telephone numbers for initiating phone calls from the converter over the local area network, and icons for display on a touch-sensitive screen 68, as well as audio messaging, may all be received over the bidirectional communications link from a cable converter 6.

The various forms of data received are in serial format and are received by a microprocessor 89, which may be the Motorola 68000 processor, or an equivalent. Associated with the microprocessor 89 is a random access memory 90 and read only memory 91. The read only memory 91 provides for enough operating system software such that the microprocessor 89 can establish communication with the cable converter, and provide enough operating system instructions to download the remaining portion of the operating system to the RAM 61 as it is received from the cable converter. Further, the various icons associated with services subscribed to by the user are also received over that serial data stream and stored in the RAM 90.

The touch screen display 10 has its own encoder for encoding each position on the screen as a selection. Thus, for each of the displayed icons on a display 10, representing a command for execution, touching the respective icon is encoded as a digital selection to the microprocessor 89.

The capacitance receiver 92 responds to any handling of the remote control device. The capacitance receiver 92 generates a power on/off signal for the device so that as soon as the consumer handles the device, the unit is fully powered and operational. The fully powered operation state may also generate an IR command to any household device for setting a particular operation condition for the device.

Further, the universal remote control device includes an infrared remote receiver 27 which permits the remote control device to be uploaded via an infrared signal, as will be explained with respect to another embodiment of the invention. Thus, in some simplified versions of the remote control device, programming of the device may only be via an IR receiver 56. The IR receiver 27 is coupled via an IR diode to a phone coupler, to be described with respect to FIG. 12, which receives commands from a central programming facility.

An opto-photo signal detector 26 is shown as a further input. When advertising indicia is imbedded in a video signal being displayed on a television receiver, the opto-photo signal detector 26 will detect the encoded video signal and supply a digital data stream to the analog signature and signal processor 93. This will decode the variations in luminance of one or more lines of a video signal which occur as a result of a data signal imbedded in the displayed video image, and provide the serial data stream to the microprocessor 89.

General logic interface (GLUE) logic 95, provides for a logic circuit for connecting a data bus 96 and address bus 97 to the microprocessor 89. Further, an output port of microprocessor 89 is connected to the glue logic 95.

An IR LED driver 96 supplies a current to the LED 97 for providing an IR output 29 for signalling the various appliances which are to be controlled remotely. The glue logic 95 will supply the IR sequences from codes, stored in the RAM 90, upon command of the user. This command, decoded as a selection on the touch screen 10 represented in FIG. 1, will be decoded to indicate that a remote control function is being selected. The particular IR code associated with the device being operated, as well as the function being operated, is retrieved from the random access memory 90. These codes describe carrier frequencies, pulse widths and pulse duration to be generated to the glue logic 95 for producing infrared pulses from the infrared diode 97.

A speaker driver 99 and sound speaker 39 is also provided in the universal remote control device. The cable television converter may generate digital voice messages for the user of the wand. Digital messages, when transferred to the universal remote control device, will be decoded into analog signals for reproduction in the sound speaker 39. As a further feature of the device, a locator selection may be made at the cable converter for initiating a beeping sound from the speaker 39 in the event the universal remote control device has been misplaced.

The universal remote control device is completely programmable from either the head end cable facility via the bidirectional communications link or through an IR link connected to a telephone. All the functions which are to be authorized by the authorizing facility, such as a cable head end facility, are downloaded via either the cable converter and bidirectional link, or through the IR receiver 27 coupled to an IR modulated signal derived from a telephone interface 25. The microprocessor unit 89 will receive the serial data in a specific format for storage in the RAM 90.

Figure 11:
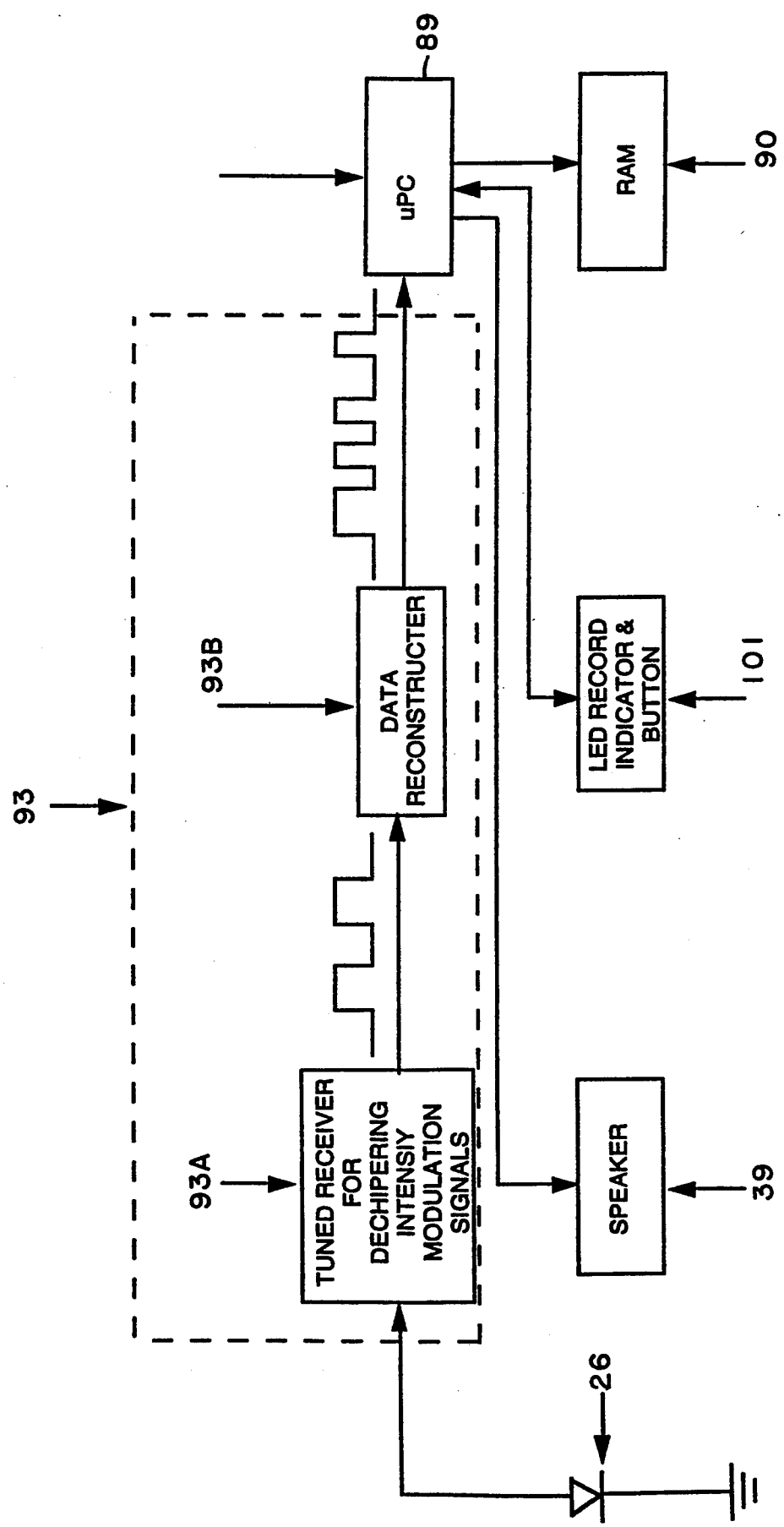
FIG. 11 is a block diagram of the system for optically detecting messages embedded in a display broadcast.

The feature of the universal remote control of FIG. 10 which will decode an embedded data signal in one or more lines of the video signal is shown more particularly in FIG. 11. The analog signature and signal processor 93 includes a tuned receiver 93a which will detect the luminance modulation on the displayed video image. By pointing the remote control device such that the opto-photodetector is oriented to detect the luminance transitions representing the data signal, a serial data signal can be obtained. A data reconstructor 93b will remove the synchronization pulses and error correction codes, and otherwise provide the serial data for the microprocessor 89.

In the preferred embodiment of the invention, broadcasts carrying data which may be captured by a user, are accompanied by either an audio or visual indication that such data is present. This indication could be an icon displayed with an advertisement program being broadcast, or an audio signal heard by the user. A user wishing to capture the data being transmitted with an advertisement will push the indicator button 101. This switch will result in an LED associated therewith being illuminated when the microprocessor 89 has determined that a full message has been received from the displayed image. At this point, the user knows he has captured the data signal and may release the button. The button and indicator 101 are merely present to provide assurances to the user that the data stream contained in one or more lines of a video signal has been completely received and pointing of the photo-optic detector 26 at the television receiver need not be continued.

The RAM 90 of FIG. 10 will store the decoded information that has been detected. This may be the date, times and channel number of a special broadcast which the user may wish to display or record. This date, time information, including a start and stop time for the program, can then be transmitted via the LED 97 to a video recording device using one of the IR codes appropriate for controlling this video recording device.

The advantage of programming the video recording device this way is that the user need not be involved in any tedious calibration or set up procedure for the video recording device. Rather, all programming data is obtained from the imbedded data signal associated with the displayed advertisement and used to set up the video tape recorder.

Additionally, using the bidirectional communications link of FIG. 10, the set top converter may be configured with the date and time of the future broadcast to be certain to be turned on at the appropriate time and tuned to the appropriate channel to permit a recording of the future broadcast.

This feature may also be used to recover data pertaining to an advertisement being shown on the television receiver. The recovered data may either indicate on the touch-sensitive screen 10 a phone number to manually call, or in a further embodiment of the invention, may include a digitizer for the telephone digits, which can be forwarded to the cable converter. The cable converter, upon receipt of the telephone digits will place a call through its telephone interface to the sponsoring party. The sponsoring party may then obtain, either through caller ID equipment at the sponsoring party's location or through a digital message originating from the cable converter the user's address for receiving further information on a product being advertised.

Figure 12:
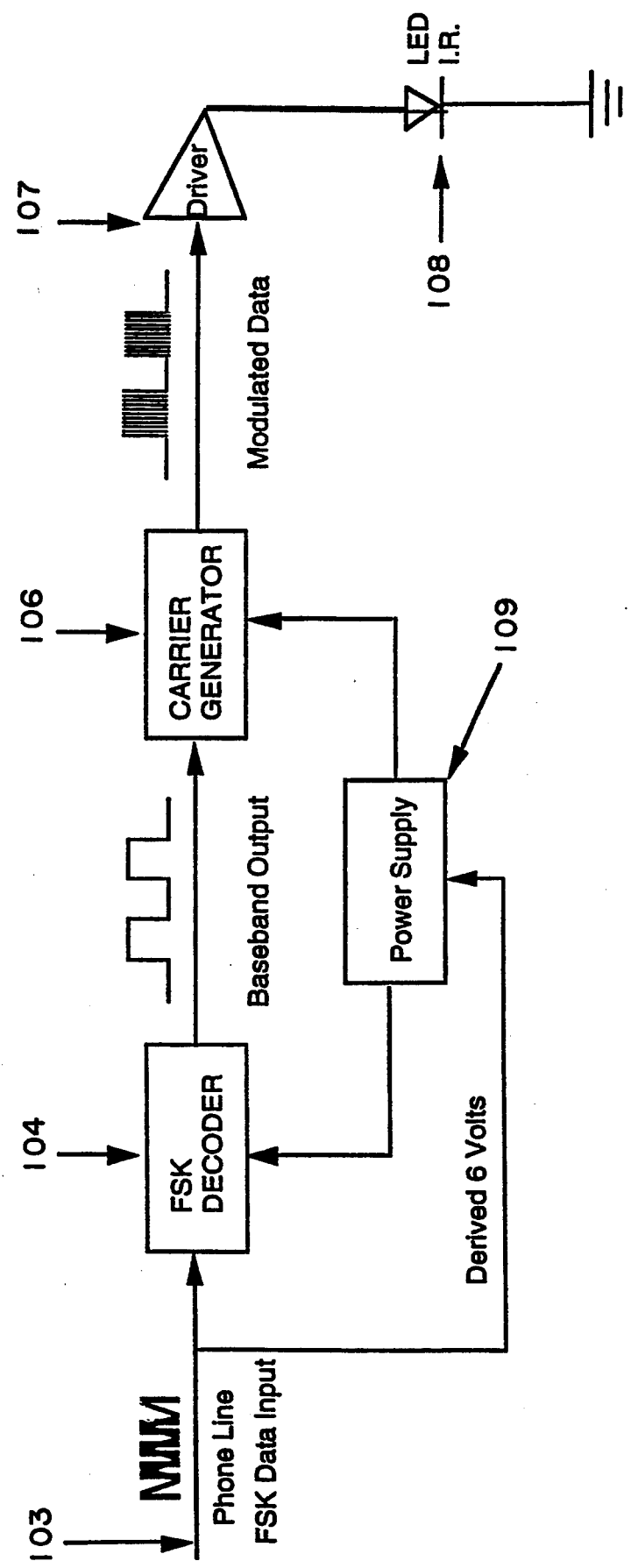
FIG. 12 illustrates circuitry for interfacing with an IR input port of the remote control device.

FIG. 12 illustrates more completely how the universal remote control device may be programmed via a telephone line rather than from the bidirectional link with the cable converter. A telephone line 103 is connected to the local area network. A user may contact the authorizing authority by telephone and request that he receive either IR codes or other programming data for the universal remote control device, including the remaining operating code for the microprocessor system over the local area network. As will be evident with respect to the flow chart of FIG. 13, once the authorizing party initiates a data transmission, the FSK data will be received in an FSK decoder 104. The FSK decoder 104 will provide a binary sequence which represents the data for uploading to the remote control device. A carrier generator 106 is shown which is modulated with the FSK data to obtain a modulated signal. A driver 107 will amplify the modulated pulses such that bursts of IR data are produced from the LED 108. An internal power supply 109 is shown operating from the telephone line for applying an operating voltage for the device.

This feature permits the remote control device to be sold through retail outlets without requiring the cooperation of a cable television service. Thus, retail establishments selling the remote control device are able to program each remote with services which are based on the fee they paid for the remote, or on some monthly subscription basis. All programming data for the remote control device may be sent via the phone line 103 once a telephone link has been established with the authorizing authority.

Figure 13:
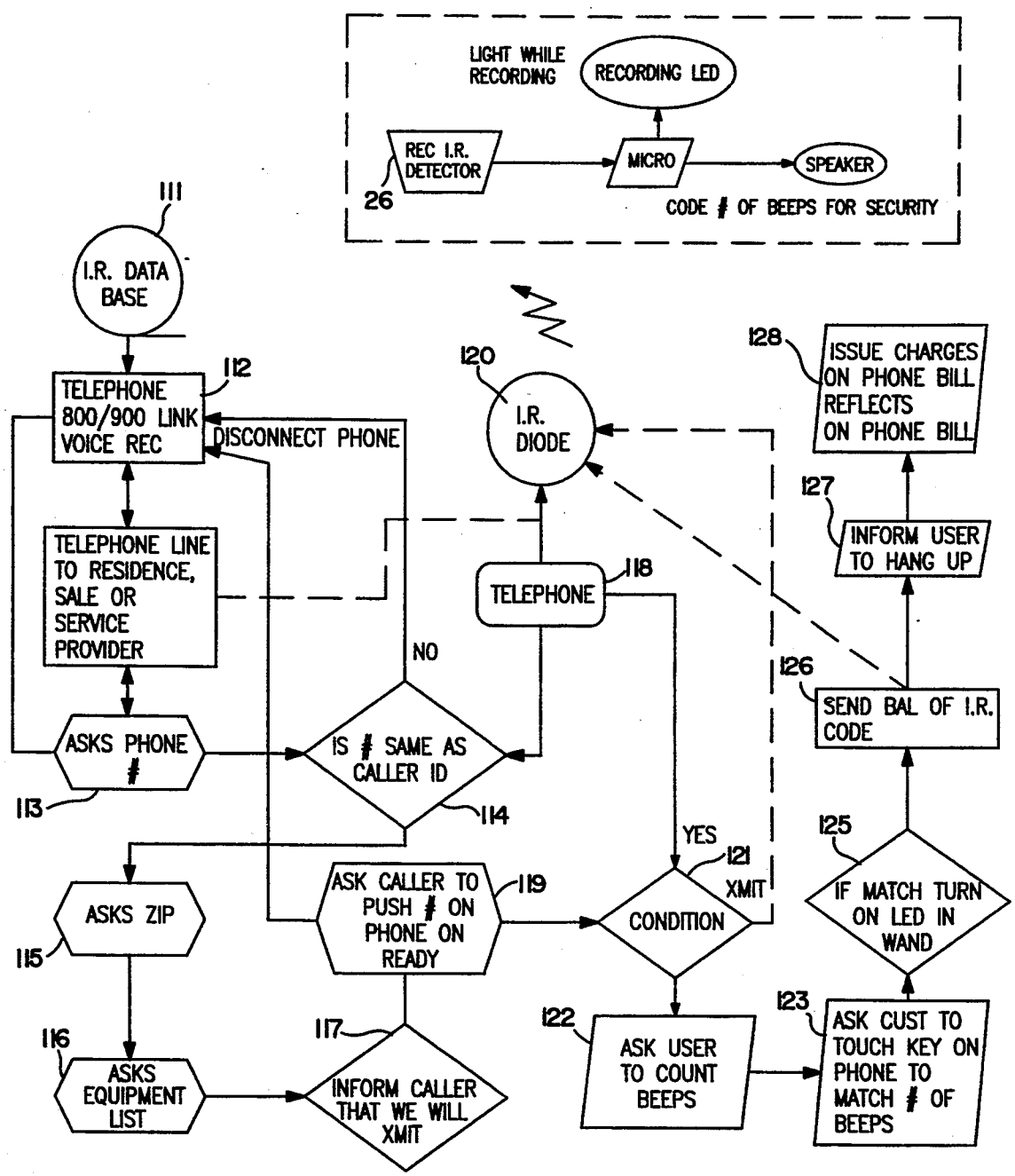
FIG. 13 is a flow chart illustrating how the remote control device can be updated via an IR link connected to a telephone line.

FIG. 13 illustrates how the infrared interface to the universal remote control device can be utilized without requiring the cooperation of the head end cable television facility. A data base having all the required infrared codes for operating appliances manufactured by various manufacturers, is compiled in a data base 111. Other programing data such as the remaining portion of any operating system necessary to completely enable the universal remote control device may also be supplied. More or less of any such operating system may be supplied by the retailer or by the central data base 111.

Either the customer or point of sale retailer initiates a telephone call with the data base via a modem/telephone interface 112 associated with the data base 111. Once the call has been placed, a prerecorded message requests the retailer or customer to provide the phone number from which the call is being made 113. The service supplying the infrared codes will then verify that the phone number is the same as a caller ID number which has been obtained at the data provider's location.

Following verification of the caller ID in 114, the prerecorded message requests the zip code 115 of the caller, and the equipment list 116 for which infrared codes are desired. The caller can input the information requested via the touch pad on the telephone. DTMF tones which, when received at the IR data base 111, identify the devices for which codes are to be transmitted.

Once the IR data base 111 verifies the data received as being properly encoded and belonging to equipment for which it has IR codes, the caller is informed in 117 that the IR data base 111 is ready to download the required IR code information. The caller is requested at 119 to push the pound button on the touch keypad when he is ready to receive the data. The caller must appropriately position the transmitting LED 120 of FIG. 12 with respect to the receive IR detector 26. Once the interface device 12 has been so positioned, the retailer or consumer presses the pound sign 119 on the touch keypad. The FSK modulated tones will then be received in the FSK decoder 74 and applied via modulated IR pulses 77 to the receive infrared detector 26. At the conclusion of the transmission of all the IR codes, along with an identification data indicating which device each IR code belongs to, the recording LED 76 is illuminated, indicating the data transfer is in progress. When the LED 66 is not illuminated, the user knows that the data transfer has been completed.

This occurs when substantially all the information has been downloaded to the universal remote control device. Prior to completing the data transfer, the prerecorded message from the IR data base 111 will request the user in 122 to verify its connection by counting the number of tones transmitted following the prerecorded message. The customer is asked in 123 to initiate an identical number of beeps from activating the pound sign on the touch telephone keypad. If there is a match, data is sent in 125 to the customer in 124 to turn on the LED on the remote control device.

Since the IR data base 111 will know that the number of tones initiated by the customer equals the number requested, it will in 12 initiate transmission of the remaining data stream for the IR codes in 126. Following transmission of these IR codes in 120 by the LED, the prerecorded message informs the user at 127 that the data transfer is complete and to disconnect. A phone bill received will reflect the charges applied in 128 for providing the data transfer.

Thus, it can be seen that the universal remote control device can be downloaded with infrared codes without the cooperation of a cable facility. The service for programming the device can be a separate profit center and the consumer avoids any tedious programming steps for obtaining all the necessary IR codes to operate all the remote control devices in his home.

It is possible for cable television systems to offer this service as well. In this situation, the head end cable facility will initiate a data transfer of the infrared codes to users who have subscribed to this service via the cable converter.

Direct broadcast satellite service may also be used to upload various IR codes and operating data for the universal remote control device. In this application, the cable converter becomes more appropriately an addressable earth station terminal.

Figure 14:
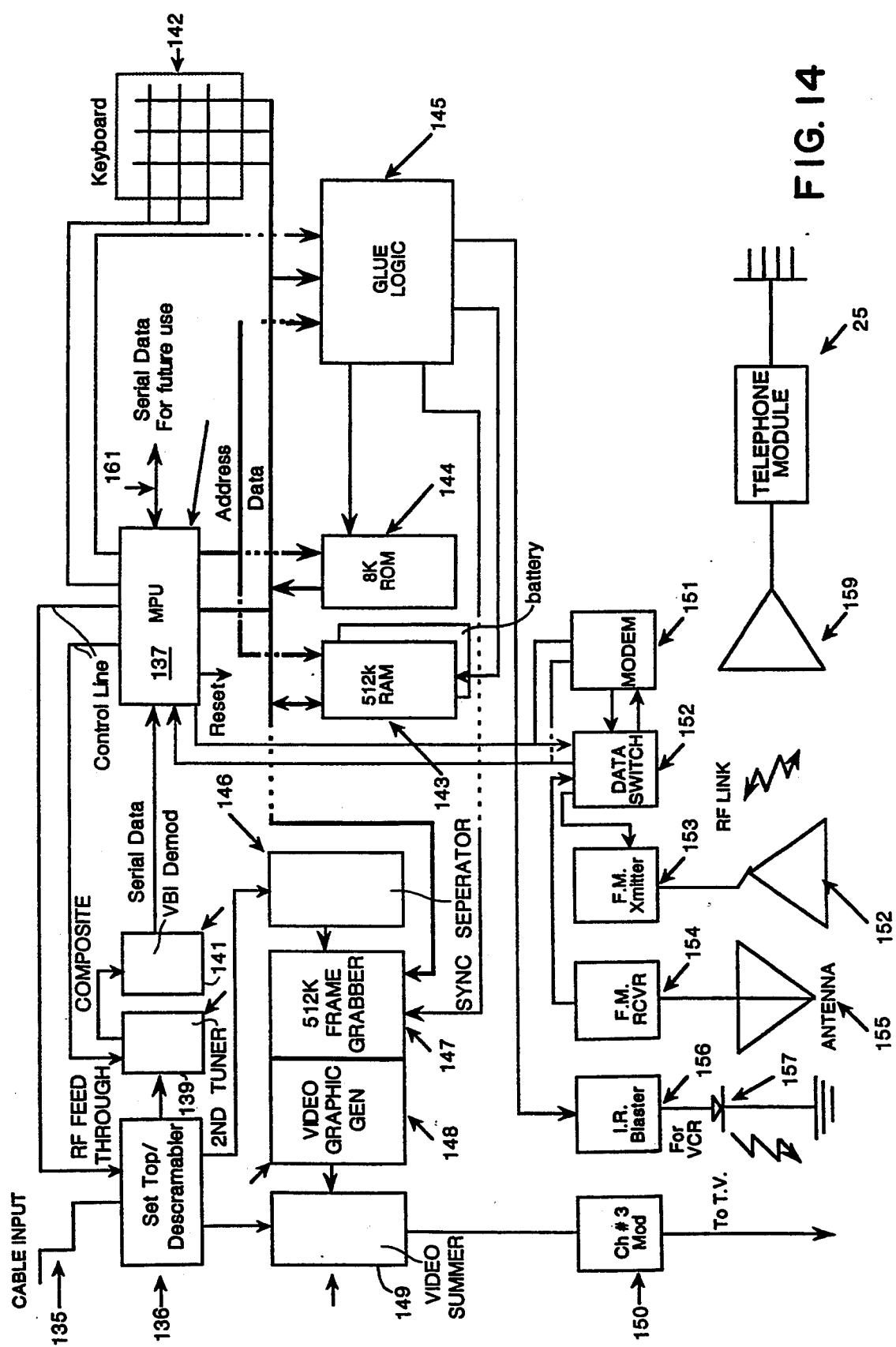
FIG. 14 is a block diagram of a cable converter which is connected via a bidirectional communication link with the universal remote control device.

The organization of the cable converter is shown in FIG. 14. Referring now to FIG. 14, a cable 135 from a head end cable facility is shown connected to a set top descrambler 136. The set top descrambler 136 is controlled by the microprocessor unit 137. The microprocessor unit 137 may be a Motorola 8051 which enables and disables descrambling of the video signals received in the descrambler 136.

A second tuner 139 is shown to permit tuning of a second channel on the cable system under control of the microprocessor 137. The second tuner 139, in accordance with the preferred embodiment, will search for a channel having a video signal associated therewith carrying a data signal for authorizing descrambling of the received signals, and providing various other data needed for the cable converter and universal remote control unit. A VBI demodulator 141 is shown which will remove the located data from the vertical interval, and apply the demodulated serial data to the microprocessor unit 137. It should be recognized that this data need not be sent in the vertical interval, but may be used to modulate a spare cable channel signal. However, it is contemplated that the vertical interval data transmission scheme would be preferable.

A keyboard 142 permits the user to turn on the converter, as well as select various channels and features such as parental control, etc. Other function selections provided by the keyboard 142 include locating a lost or misplaced remote control device by generating a signal for transmission over the bidirectional link for sounding an audio alarm on the remote control unit.

The microprocessor unit 137 operates with a battery-backed non-volatile 512K RAM 143, as well as an 8K ROM 144 which includes a kernel operating system sufficient to permit the microprocessor unit 137 to search for the correct channel number and video line number having the data for completing the operating system instructions.

Glue logic 145 is connected to the address and data bus lines for the microprocessor unit 137. The glue logic 145 will provide various enabling signals in accordance with the instruction set being executed by the microprocessor unit 137 for the various connected devices.

A sync separator 146 is shown which will provide timing pulses to a 512K frame grabber 147. The frame grabber 147 will identify the frames of video data being sent as text or graphic material. A video graphics generator 148 operates from the video text recovered by the frame grabber 147. The recovered video text is summed with descrambled video in video summer 149.

A channel 3 modulator 150 is shown to convert all tuned cable channels to a common RF channel for most television receivers.

The converter of FIG. 14 includes a bidirectional communications link to both the universal remote control device and to a local area network telephone line. A modem 151 can communicate through an antenna 152 connected to a radio telephone interface. In this way, calls can be placed by the converter under circumstances to be described to establish a telephone connection with respect to an entity whose telephone number has been stored in the RAM 143.

Data is provided via the modem 151 through a data switch 152 which is operated by the microprocessor unit 137 when a call is to be placed over the local area network. Additionally, an FM transmitter 153 will provide the radio frequency and carrier signal for broadcasting the dialing digits as well as an appended digital packet to the telephone interface 25. Once a connection has been established with the called party, the digital packet can be supplied to the FM transmitter 153 for broadcast to the telephone interface 25 and its respective antennas 159.

The FM transmitter 153 will transmit data on a second carrier to the universal remote control device. The FM receiver 154, with antenna 155, forms a second half of a bidirectional link with the remote control device and telephone interface. Data received is, in turn, connected to the data switch 152 for routing the received data to the microprocessor unit 137 for decoding and execution.

The IR blaster 156 is shown for driving an LED 157. The LED 157 is an infrared diode, and provides for programming of the user's VCR through its IR window in accordance with data received from the head end facility. Thus, the converter may directly program the VCR such that future broadcasts may be automatically recorded in response to the infrared information.

An additional serial port 161 on the MPU 137 will permit uploading or downloading of data to the MPU 137 from and to other sources as may becomes available in the future.

The cable converter of FIG. 14 is configured such that it may be initialized in the field from the head end cable facility. This would include identifying the remote control devices with which it is authorized to operate, as well as supplying all the required IR codes to operate the consumer's remote control devices. Information for permitting calls to be generated from the converter, either back to the head end system or to various vendors of products which are being ordered by the user, must also be downloaded.

The cable converter includes numerous security provisions to prohibit the cable converter from being moved to another location and connected to another cable television system or the same system without authorization and without paying the new system owner the required fees.

Further, the converter is sent to the field with only a partial kernel operating system. The remaining operating system is downloaded from the cable system to make the converter box totally operable.

The information for enabling the programmable remote control device to operate is transferred from the cable head end system down to the converter. This information is subsequently downloaded to the remote control device 5 over the bidirectional link linking the universal remote control device to the converter 6. IR codes and icons representing the services that have been paid for, are downloaded to the remote control device 5 after being received from the cable head end facility.

Figure 15:
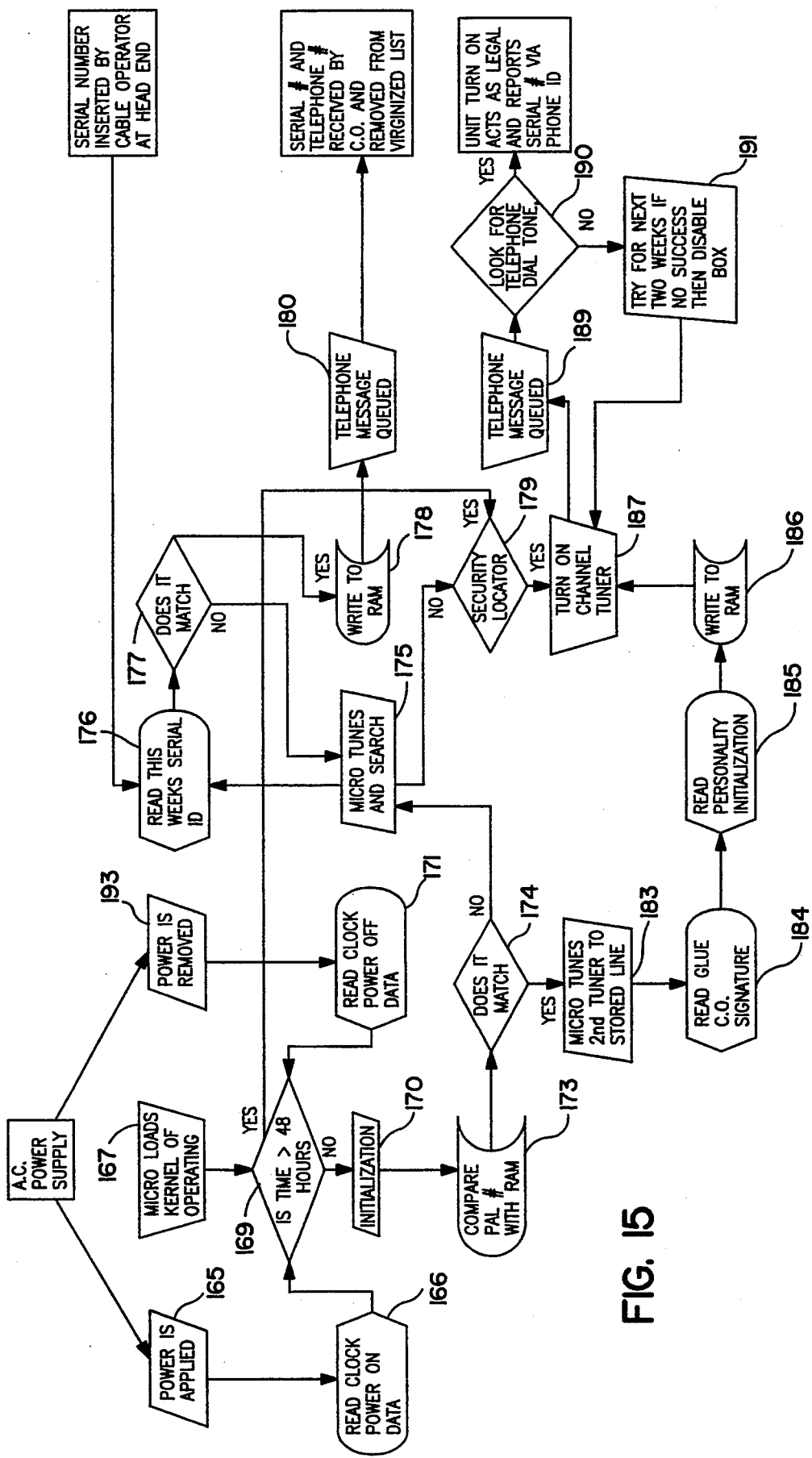
FIG. 15 illustrates a system flow chart for illustrating operation of the cable converter of FIG. 14.

The operation of the cable converter security measures and field initialization is can be described with respect to FIG. 15. In this Figure, block 165 indicates that the power has been initially applied to the cable converter. The operating system kernel located in the ROM 144 of FIG. 14 is then loaded into the microprocessor unit in 167 to begin operation of the cable television converter 6. At the same time, a battery-backed clock is read in 166.

Decision block 169 plays a role in maintaining security of the converter. Assuming this is the first time the television converter has been activated in the field, the decision block 169 will pass control to an initialization step 170. As the READ POWER OFF date 171 will not be 48 hours earlier than the POWER ON date in step 166, the initialization 170 may commence.

The initialization commences by reading the contents of a programmable logic array (PAL) having fixed therein a permanent identification number for the converter 6. The microprocessor unit 137 of the converter also reads an address within the non-volatile RAM 143 in step 173 which would normally have the same identification number had the cable converter 6 been previously initialized. As there is nothing written to this location in the random access memory 143, decision block 174 will indicate that the number within the PAL must be verified by the head end facility.

This verification failure begins with a tuning sequence 175 for the second tuner 139 of FIG. 14, such that the channel as well as vertical blanking interval line number is found containing the head end system data. Each VBI line of each channel is searched in 176 until a specific line containing a specific service provider ID is obtained in step 177. The service provider ID is a 12 bit identifier following a clock synchronization interval of 16 bits, and a bit synchronization interval of 8 bits. The microprocessor 137 will detect from the service identifier the fact that this line contains the information for activating the cable converter 6.

The data received on this channel and line number is continuously read through a series of frames of video signals received. Once a serial number is encountered in a subsequent service packet, identified by two ASCII characters, the remaining data fields may be written to the volatile random access memory in step 178. Further, the identification number will be written to the RAM

143 when a match is found between the PAL stored identification number and a received serial number in the service field.

The channel number and line number containing the serial number are also written to a dedicated location in the random access memory 143. Subsequently, when the power is removed from the cable converter 6, the search routine will not be needed as the channel number and line number containing the identification number, as well as other information packets is available from the random access memory 143.

Subsequent lines of the video signal include in a field following each clock synchronization interval CS and bit synchronization interval BS, a packet identifier which will identify to the set top converter 6 codes BP for completing the operating system, the set top converter data BD, the remote controlled device operating system, the remote controlled image data for generating icons to be displayed, remote control digital messages, a RESTART command to the set top computer to reinitialize its microprocessor system codes and a RESTART command to reinitialize the remote control device operating system. Various other fields transmitted, as is known in the data transmission art, include a maximum packet length, additional framing pulses and error correction data.

The cable converter microprocessor unit 137 will decode each of these fields in turn, and write them to the RAM 143 of the cable converter 6. Data destined for the remote control unit 5 will be forwarded via the bidirectional communications link from the cable converter RAM 143.

As part of the initialization phase of the cable converter, once the match between the converter ID and a transmitted ID from the cable head end is detected, the cable converter places a phone call in 180 to the cable head end system, reporting its serial number. The message is composed, which is sent via the bidirectional link to the telephone interface 25. Telephone interface 25 places the call and transfers a message containing the serial number to the head end facility. Further, caller identification equipment at the head end will identify the phone number from which the call is being placed, and log the serial number with the phone number for security reasons. The cable system will then remove the serial number from its subsequent VBI broadcasts as the converter has indicated it is initialized.

In subsequent operations of the cable converter, each time power is applied in 165, the microprocessor unit 137 will compare the permanently stored identification number in the PAL with the contents of the RAM which were previously written with the detected identification number in step 173. The match of these two numbers in decision block 174 will command the second tuner to be tuned in step 183 once again to the channel number bearing the vertical blanking interval data. As each head end system can use a different channel to transfer data to its customers, it provides a first security feature prohibiting the theft of a converter 6, and its subsequent use on a different cable system having a different channel for transmitting data to the converter. Step 184 permits comparison of a cable operator ID which was initially installed in the PAL at the time of manufacture before sending the cable converter to the field. This read number is compared with the identification field in the vertical blanking interval identifying the cable operator.

Once this comparison is obtained between these cable operator identification numbers, the personality register is set in 185 on the cable converter box. The personality register consists of a number of address locations within the random access memory 143 which can be personalized for the particular consumer, i.e., demographic information relating to either the consumer's address, income level, number of family members, be loaded in the personality register. In the mode for transmitting advertisements to the user's remote control unit from the cable head end facility, the information within the personality register will be used as a criteria to determine whether or not such advertising is to be forwarded on to the remote control user.

After writing the personality register in step 186, the channel tuner may be enabled in step 187.

Various additional security measures are present such that if the cable converter has not found the ID number after a time out period, a security locator mode is entered in decision block 179. This mode will cue a message in 189 and place a call back to the cable head end system in 198 to indicate that the identification number was not found, and to identify the converter ID. Using caller identification equipment at the cable head end system, it is possible to identify the location of the cable converter that was unable to make the verification. If the call cannot be successfully placed through the telephone interface 5, the converter will be disabled after a time out period 191.

As yet another security feature, decision block 169 will determine from the clock indication in step 171, indicating when power was removed in 193, and the received on-time from step 166 how long the converter has been disabled. If this exceeds a value such as 48 hours, the converter will place a call through the security locator decision block 179 and cue a message for transmission back to the head end system, indicating that the unit had been off more than 48 hours. This will also identify those units which were disconnected from service and moved to a location having a telephone number different from the one initially reported to the head end system during initialization.

The converter 6 is totally addressable. It is possible to disable the 48 hour criteria in decision block 169 should the cable operator know that a substantial number of units have suffered an inadvertent power failure. This would prevent the cable converters from reporting back through a circumstance of power loss beyond their control. The suppression of this feature can be implemented by issuing a polling command or a command to all units within the cable system for suppressing the callback feature in all converters.

The vertical blanking interval will also contain the various advertising messages which will be decoded on a periodic basis. These messages are located by continually monitoring the VBI line number and channel number which was stored in random access memory 143. Thus, messages can be decoded which are either specifically addressed to the particular converter, or which have an ALL CALL field indicating that all converters receiving the messages should decode and store in the non-volatile RAM the contents of these messages.

Figure 16:
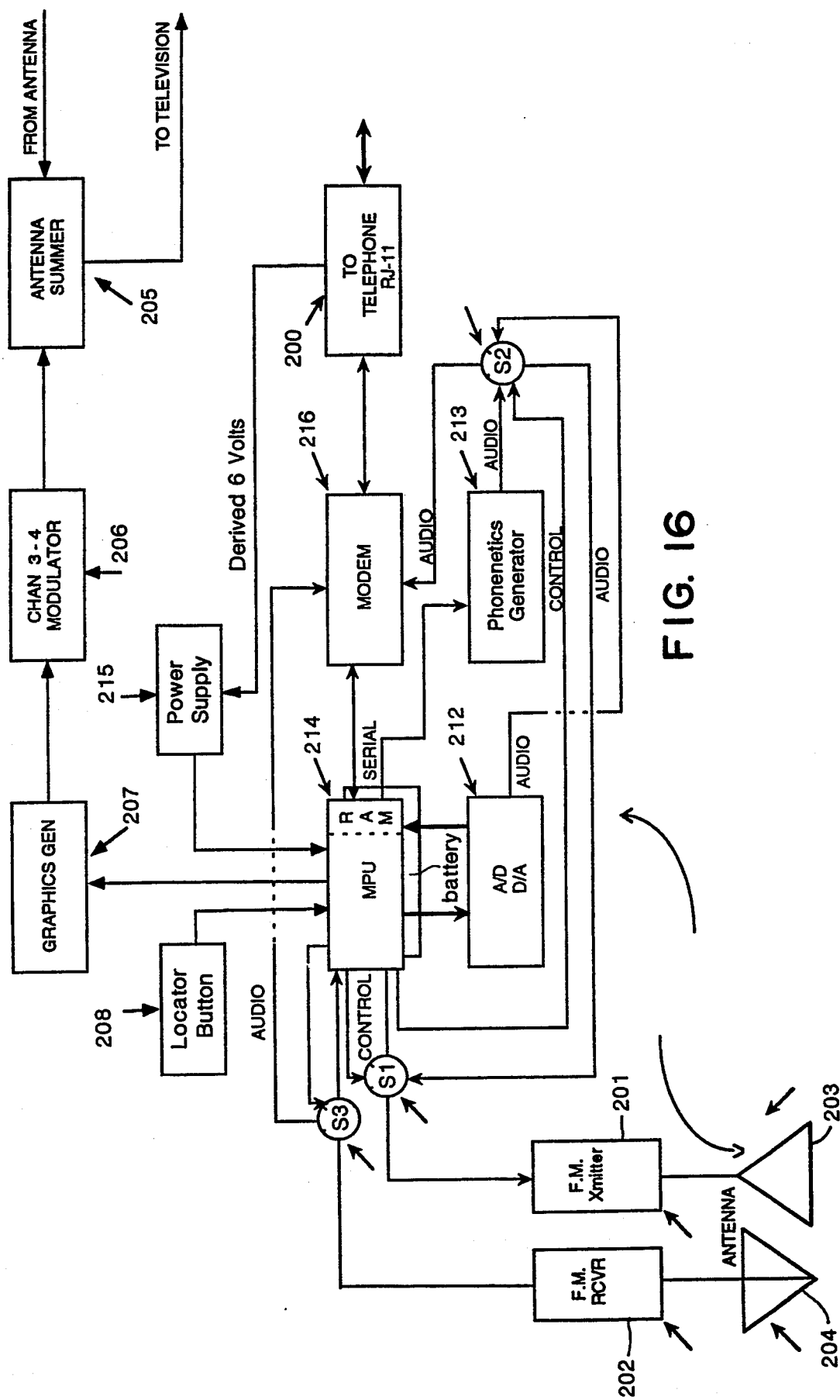
FIG. 16 is a block diagram of the telephone interface 25.

FIG. 16 is a detailed block diagram of the telephone interface 25. The telephone interface 25 communicates via a telephone RJ11 jack 200 with the local area network. An FM transmitter 201 and FM receiver 202 provide for bidirectional communications through suitable antennas 203 and 204 to both the universal remote control device 5 and the converter 6.

An antenna summer 205 is shown for supplying to a television receiver downloaded menus which may be displayed by the user's television receiver 9. This mode of communication permits such menus to be transferred to the user without the cooperation of a cable facility network. Alternatively, such menus could be transmitted by the cable head end facility through the set top converter 6, and then to the telephone interface 25.

A graphics generator 207 generates the menus for display and modulates the video signal for these menus on channel 3, using a modulator 206. Voltage for the interface is from a power supply 215 which can generate an operational voltage from the line voltage on the local area network.

The telephone interface 25 includes its own microprocessor unit 214. Microprocessor unit 214 provides for the various communications protocols necessary for communicating over the bidirectional link, and for operating the remaining components of the telephone interface.

A phonetics generator 213 is also shown. Any audio messaging data transferred via the cable head end system to the converter, and then to the universal remote control device 5 or directly to the telephone interface 25 may be converted to an audio signal. The resulting audio is then transferred to the FM transmitter 201 for broadcast to the user's remote control device. Thus, audio messaging may be accomplished between head end cable systems and the user.

Alternatively, audio messaging may be transferred to the user via the local area telephone network. A high speed modem 216 is provided, connected to a serial port of the microprocessor unit 214. The modem and microprocessor unit 214 cooperate together to either generate audio messaging or data messaging for display on the user's remote control device.

The modem 216 is selected to be of a high speed type, such as 2400 Baud, to permit the rapid transfer of menus from a distant data base, via the telephone line connected to the RJ11 jack 200.

The telephone interface of FIG. 16 will provide for an interactive system of messaging between the user, the head end cable facility and a third party data base supplier or vendor. In that feature of the present invention, which permits embedded data to be contained in a broadcast, recovered embedded data may form a message for the user. Further, in the so-called order-out feature, the embedded data may include a telephone number and other information pertaining to a transaction to be conducted between the user and the service.

In these situations, the modem 216 will place the call to the data base service or vendor, using the messaging data obtained by the user through his optical port, or other data port on the remote control device.

Specific transactions which are conducted by the apparatus of FIG. 16 will be demonstrated with respect to the Figures to follow.

An additional feature represented by the locator button 28 will permit the user to initiate an audio sound alarm on the remote control device. In the event the remote control device has been misplaced, a locator button, when pushed, will result in a command being generated by the MPU 214. The command generated will be transmitted via the FM bidirectional link to the universal-remote control device. Upon decoding of the command, the universal remote control device will emit an audio signal through its speaker, permitting the remote control device to be located. This feature as well will be described with respect to the Figures which follow.

The apparatus disclosed in the foregoing Figures can be used to provide for the many services which had been heretofore not available. The following describes the services which may be implemented, along with sufficient information, for programming these apparatus to perform the various features.

Electronic Mail/Messaging Chart

Figure 17:
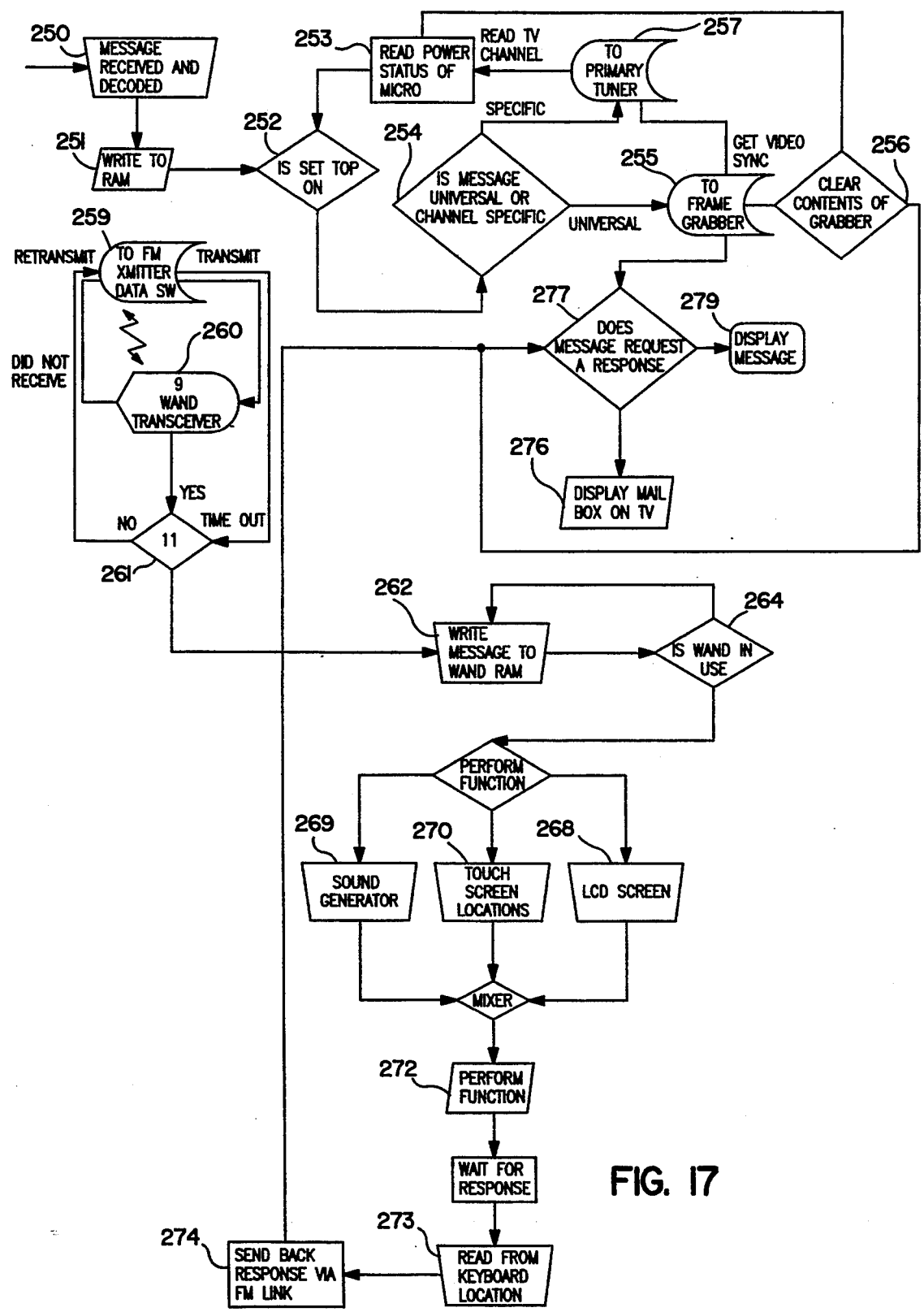
FIG. 17 illustrates how messages are transferred from a cable converter to the remote control device for display.

Referring now to FIG. 17, there is shown the steps carried out by software resident within the set top converter 6 and universal remote control device 5 for implementing the messaging process. As was described with respect to FIGS. 6, 6A, 7, 7A, 8 and 8A, it is possible to provide for display advertising as well as other messages of a non-commercial nature on the universal remote control device touch-sensitive display, as well as on the user's television. The transfer of these messages from the head end of the cable system to the user via the cable converter requires several steps for (1) downloading the information from the cable facility to the cable converter, (2) downloading the information from the cable converter to the universal remote control device, (3) indicating to the user that messages and/or other display information is available, and (4) detecting a command from the user to display such messages and/or advertisements.

The messages downloaded from the cable facility may be of an all call type for all subscribers, or one selectively sent to classes or groups of subscribers. The messages are received in the cable converter in 250, decoded from the vertical blanking interval in a preferred embodiment, or they may be transferred via a spare channel or other means selected by the cable system designer. The display images are sent as data within the vertical blanking interval in the preferred embodiment are removed from the vertical blanking interval and stored in 251 in the set converter microprocessor unit RAM. The captured frame of image data may be destined for display on the television receiver or may be destined for display on the touch-sensitive screen of the remote control device. Data will be appended to the image at a fixed location, identifying whether it is LCD display data or television display data. This data may additionally include a date beyond which display is not to be effected. Further, the channel on which the image data is to be displayed is specified, as well as identifying whether more than one frame is to be displayed with respect to the message. Data linking messages will be provided for the set converter microprocessor.

Having thus stored in RAM the complete information identifying the condition for display, the set top converter microprocessor will then determine in decision block 252 whether or not the set top converter, and hence the television receiver, is powered up. The status is read in 253 and the determination of the TV channel currently tuned is made. The content of the frame grabber are then cleared in 256.

Messages may be characterized as either universal or channel specific in decision block 254. Those messages which are universal are sent to the frame grabber in 255 which is connected to the video sync output line of the primary tuner of the television converter. The video sync output signal permits synchronization of the messages with the channel video which will display the messages.

Those messages which are specific are specific with respect to the time of display and/or to a specific channel, the message is overlayed with the program video appearing on that channel, at the time indicated after the primary tuner of the converter is tuned to that channel in 257.

There are two categories of messages, one for display on the remote control device, one for display on the television, messages are stored in a frame grabber with an indication of their ultimate destination. Transceiver protocol 259 at the converter and the remote control unit transceiver protocol 260 will continuously poll each other on a schedule established by a time out interval in decision block 261 to determine if traffic is to be transferred.

When a message is present in the frame grabber 8, the message is downloaded to the universal remote control device RAM in step 262. If the remote control is in use as determined in 264, the message will then be ready for display on the touch-sensitive screen or a sound byte is generated in response thereto for audio messages.

Additionally, where the user is to provide a response to a display in 268 on the LCD screen of the touch-sensitive screen or to an audio announcement made by the sound generator 269, XY coordinates for the touch screen location which will receive the user's response are noted in 270.

As was set forth in FIGS. 4 and 5, a mail icon is displayed on the display and television in 268, 276 which must be accessed by the user before the full message display is made. In step 270, when the mail icon is pressed, the keyboard location of the LCD screen display is encoded in 273 and sent back via the FM link to the cable converter in the bidirectional link in 274.

This mail icon represents a message request to forward the contents of the frame grabber as determined in 277. At this time, the frame grabber forwards the entire frame of data to the message RAM in step 262 for display using the bidirectional link. Additionally, it is displayed on the television in step 279.

Remote Control Locator Feature

In the described embodiments of the invention, wherein a universal remote control device communicates either with a set top converter for installations having cable service, or alternatively, to a telephone interface of FIG. 16 a locator feature may be employed. As each of the universal remote control devices 5 includes a sound generator for generating either audio messages or signalling tones, it is possible to provide for a locator function. In the event the universal remote control device has been misplaced, a command can be sent to the universal remote control device to initiate a beeping or continuous tone from the remote control device which will be heard.

Figure 18:
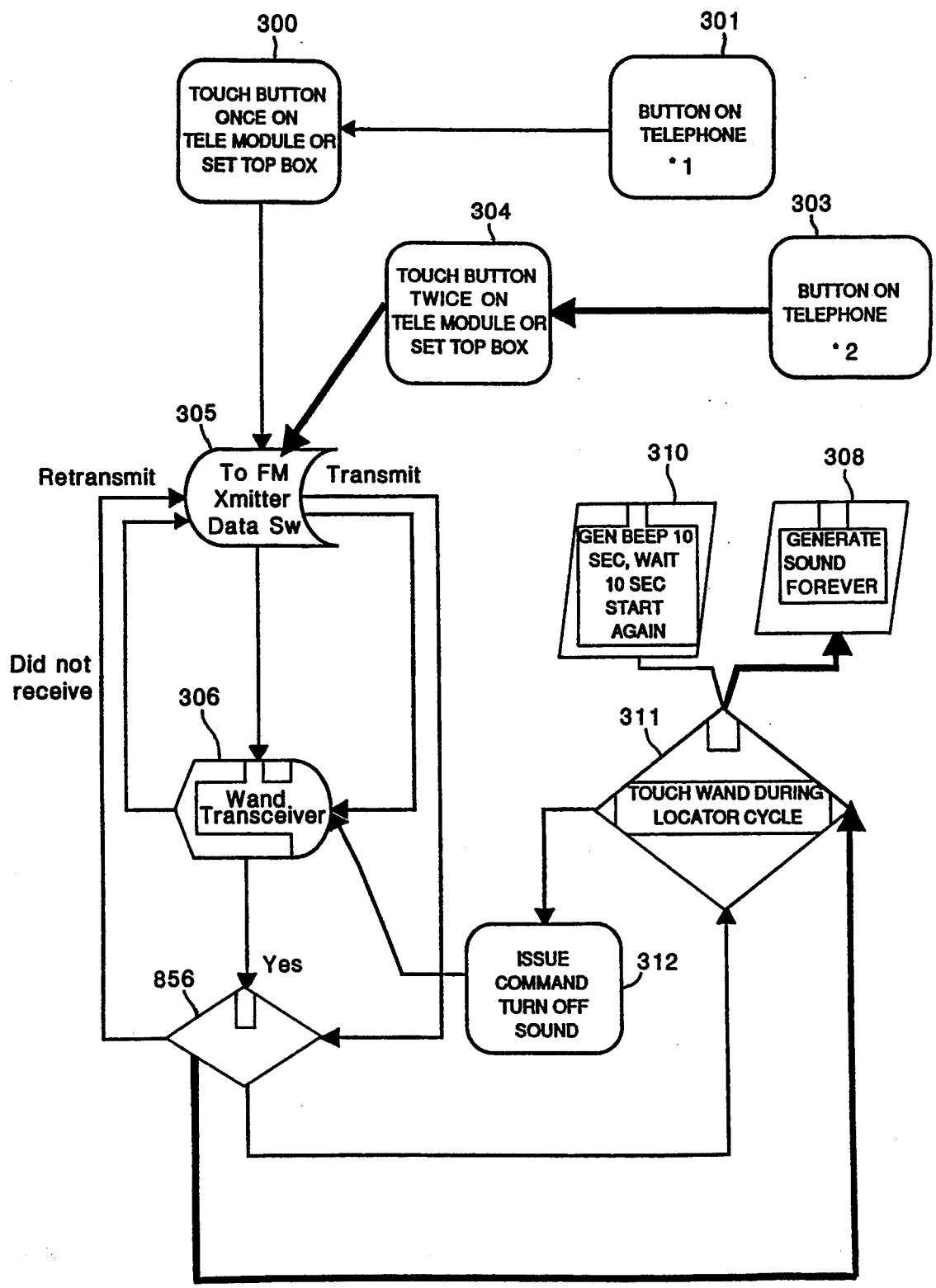
FIG. 18 illustrates the operation of the locator function provided for the remote control device.

The implementation of this feature, shown in FIG. 18, includes providing as one of the key selections on the touch pad of the set top converter, or on the telephone interface 25 a button which, when pressed, will be decoded to invoke this feature. Additionally, those homes having the telephone interface 25 will be able to initiate the locator feature by going off hook and successively selecting two digits such as * and either number 1 or number 2 digit of the keypad. This selection will be decoded by the telephone interface 25 as a request to invoke the locator feature.

FIG. 18 illustrates that in either step 300 or 301, a switch closure may be effected at either the set converter or on a switch located on the telephone interface 25 which will invoke a command, conveyed via the bidirectional communications link to the universal remote control device 5 to initiate audio signalling of the universal remote control device presence.

Alternatively, the user may go off hook in 303 and select either star and digit number 1 or star and digit number 2 in 304 to invoke the remote location feature.

In the case where step 300 or 301 is selected, a command is issued via the bidirectional communications link through the FM transmitter 305 to the wand transceiver which decodes the command in 306. If the command was presented by a single button selection on the telephone module or set top converter, the command will be decoded in 308 as a command to continuously generate an audio signal.

In the event the switch selection on set top converter or telephone module was made two consecutive times or step 303 was selected by dialing star and 2 on the user's telephone, the command transmitted will be decoded in 310 to generate pulses of sound which are, for instance, of 10 seconds duration and occur at a ten second interval.

When the user has responded to the sound generated by the universal remote control by handling the device in 311, the device will generate a command in 312 to the set top converter or to the telephone interface, indicating that the feature is to be terminated.

VCR Programming from Embedded Messages

In accordance with the preferred embodiment of the invention, it is possible to derive, from an embedded message carried with a program broadcast, information useful to program a video tape recorder. Video tape recorders currently in use permit video recorder programming through an IR interface on the video recorder.

With the embedded signalling capability of the present invention, all information for programming a VCR may be obtained from a decoded embedded signal. An advertisement for a future broadcast can include therein a signal embedded as either luminance modulation, undetectable to the human eye, or as a sub-audio signal having a level and frequency not noticeable to the casual listener which is received in the remote control device optical port 26 or microphone port 28 of the remote control device 5 of FIG. 10.

At the time of a broadcast, the user is alerted by the broadcast that such embedded data is available. The user will point the optical or microphone input port at the television 9 video display when an indication is given that data is being received from either luminance modulation or other similar embedded techniques. The message embedded in the program broadcast is captured in the remote control device when the user operates the respective function on the remote control device 5 touch screen keypad 10.

Figure 19:
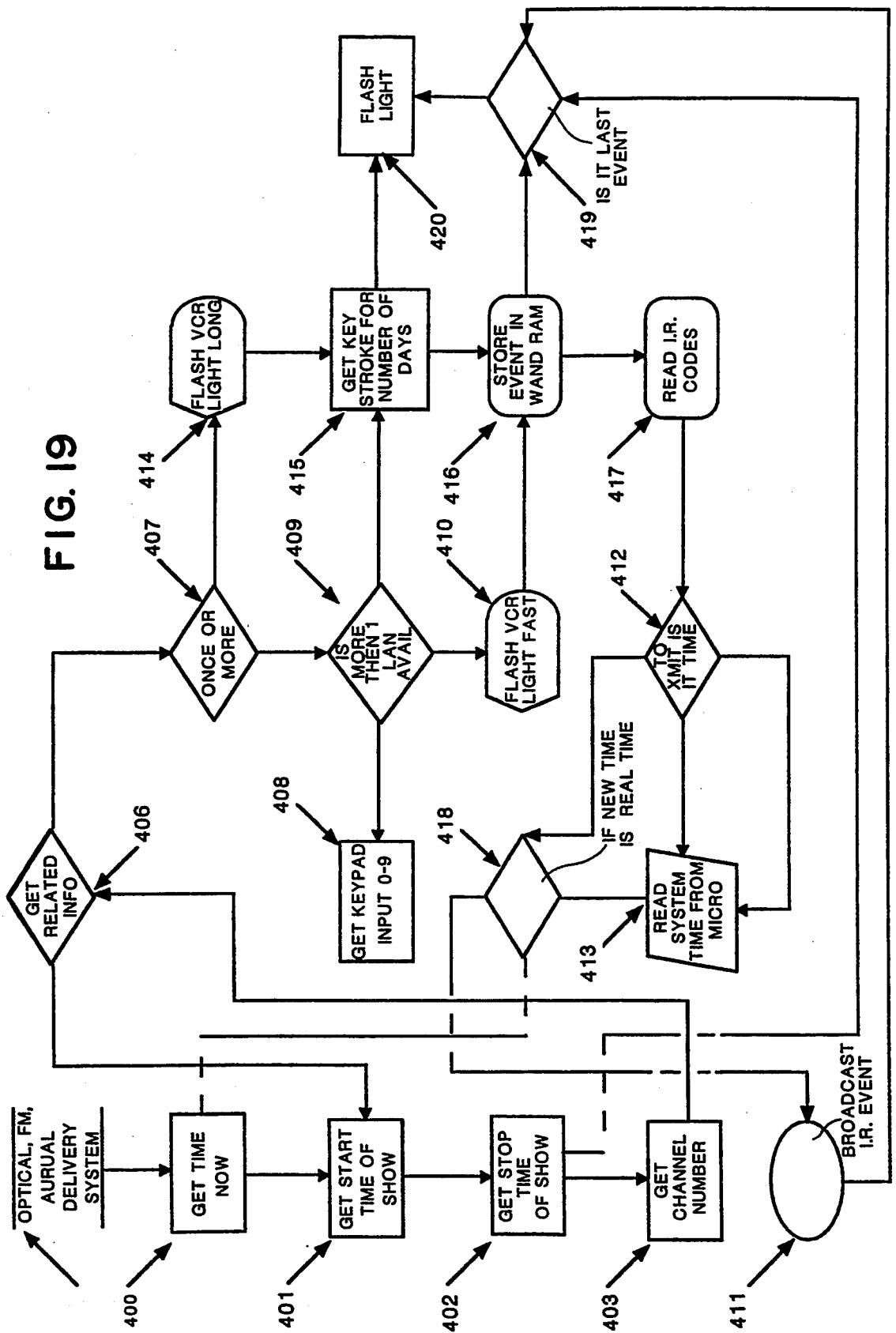
FIG. 19 is a flow diagram illustrating how the remote control device is programmed with embedded data to operate a video recording device.

Referring now to FIG. 19, the messaging sequence is shown having the data for programming the video tape recorder. The first information of significance in the embedded signal contains a current clock time 400, indicating to the user the current time. Subsequent programming times are referenced to the current time received with the program information.

A start time 401 is received in the message, indicating the time the broadcast is to begin. The start time includes a complete 24 hour indication as measured from the present time from which recording is to begin. A stop time 402 is also contained in one of the message fields to indicate when the program is scheduled to stop and recording is to end.

Another field of the message includes a channel number 403 which will identify to the VCR the appropriate channel for recording.

As yet an additional feature of this technique, a related event 406 is indicated in one of the fields of the embedded signal message and will identify a related program and automatically program the VCR to record the related program. The data represented by fields 400, 401, 402 and 403 are repeated for the related broadcast such that the VCR is programmed to record these related, subsequent broadcasts.

The embedded data may contain a message to the user that certain selections are to be made by the user. For instance, in the situation wherein more than one episode of a program will be broadcast, an appropriate field of the embedded message will contain an indication that the program contains more than one episode. In this instance, decision block 407 will generate a message 414 to the user on the universal remote control device 5 that a selection must be made to indicate whether or not he wants more than one episode is to be recorded.

At the same time this embedded data is being received, an advertising message is displayed on the users' television set, indicating that a selection is to be made. The advertisement will contain an instruction to select a given digit for indicating whether or not the user wishes to record the additional episodes.

The user signals his selection by operating the keypads in step 608 in the manner instructing by the advertisement. As an additional decision, the user may be requested to select a language when more than one is available in decision block 409. Once again, the advertisement for the program will indicate that the user is to make the selection if he is to watch the program in a language other than the default language of English. This selection is made by the keypad 408 in accordance with the instructions given in the advertisement.

Each selected event is stored in the universal remote control RAM in step 416, which will result in the VCR being activated during the start and stop times indicated by each event. The remote control device will transmit IR commands at the appropriate time to record the events being televised.

The real time clock for the system device is compared in 412 with each of the start times for the events stored in the RAM. When an event start time is found to equal the real time, as determined from 418, the IR codes 417 are generated for starting the VCR recording process, and stopping the VCR recording process. These IR codes are broadcast in 411 from the universal remote control device to the VCR. The VCR is therefore set to record at the appropriate time.

In the event a plurality of events are stored in the RAM in previous step 416, a feature is provided which will identify to the user that subsequent events are yet to be recorded following recording of an event. Thus, in step 419, a determination is made as to whether or not there are any additional events stored in the RAM 416 to be recorded. If there are, a display indication is given at 420 to the user to remind the user that the VCR must have a tape inserted as future recordings are expected to be made.

In the event the last event has been recorded, the remote control device RAM locations containing programming data in 416 will be cleared. As no further events are to be stored, no indication will be displayed to the user to remind the user to have sufficient tape in the VCR device.

The display indication given that further broadcasts are to be recorded, is extinguished by selecting a touch-sensitive screen location in step 408 which will extinguish the indication until such time as a subsequent event is cued up for recording which is not the last event to be recorded.

Favored Channel Selection/Recording

The universal remote control device of the present invention may record over time the selections made by a user for a particular mode of operation. Specifically, users that make channel selections from the remote control device will be afforded an opportunity to store in an appropriate cue channels which are viewed on a frequent basis, such that the universal remote control device will either command recording of subsequent broadcasts of the favored programs or command the television receiver to automatically tune and display the subsequent broadcasts. The programming of this feature is shown more particularly in FIG. 20.

The favored channel feature operates by monitoring keypad selections 470 of the touch-sensitive screen 10 in a particular mode of interest. The keypad input 470 is read in step 471 and stored in a temporary RAM 415 location. If the selection is made from a television mode as determined from comparing it in 474 with the contents of the look-up table 473, the event is written to RAM 90 in step 475, and is time stamped with the system clock time from step 476.

The remote control device 5 RAM 90 will thus contain the identity of the selected channels as well as the time of selection. These selections will constitute the basis for a favored channel database.

The information written in the RAM in step 475 is a presorted compilation of channels which have been watched by the user. From this presorted compilation, a data base of favorite channel selections may be compiled.

This second compilation is based on customer choice, as well as a second criteria level, represented in 478, for determining when entries written to RAM in 475 have exceeded a certain frequency threshold.

At the time a user is operating the remote control device, represented by 479, which concurs with criteria in step 478, i.e., user is watching a channel at a time which past the second criteria, user is asked in 477 if he would like to make this particular item a favored channel. The user can, selecting one of two or both of 481 and 488, indicate that the favored channel is to be stored for recording, stored for watching, or both. This response will result in the selection being written to the favored data base portion of the RAM in 490.

Therefore, 490 represents those favorite channels which have passed first and second criteria, and which include an indication by the user that they are to have this status.

The system clock 476 is constantly monitored in 489 to determine whether or not a time associated with an entry in the favored data base RAM represented by 490 is coming. In approximately 1 minutes' time before a selection contained in the favored data base RAM 490 occurs, the user is prompted by an indication on the remote control device 487 that a favored event will be occurring very soon.

The customer is prompted in 486 to indicate if he would like to remove the event from the favorite channel data base. Upon selection of another response using the touch-sensitive screen keypad, the selection may be erased at 492 from the favorite channel data base RAM. If no response is made, the entry is transferred to either the viewing cue 480 or recording cue 491. These cues have been established, as is evident from other portions of the disclosure, to contain information for programming either the VCR to record the program, or to provide IR commands to the cable converter for tuning to the particular program. IR codes for operating the television receiver may also be generated to permit the program to be viewed on the television receiver.

Consumer Activity Report

Figure 21A:
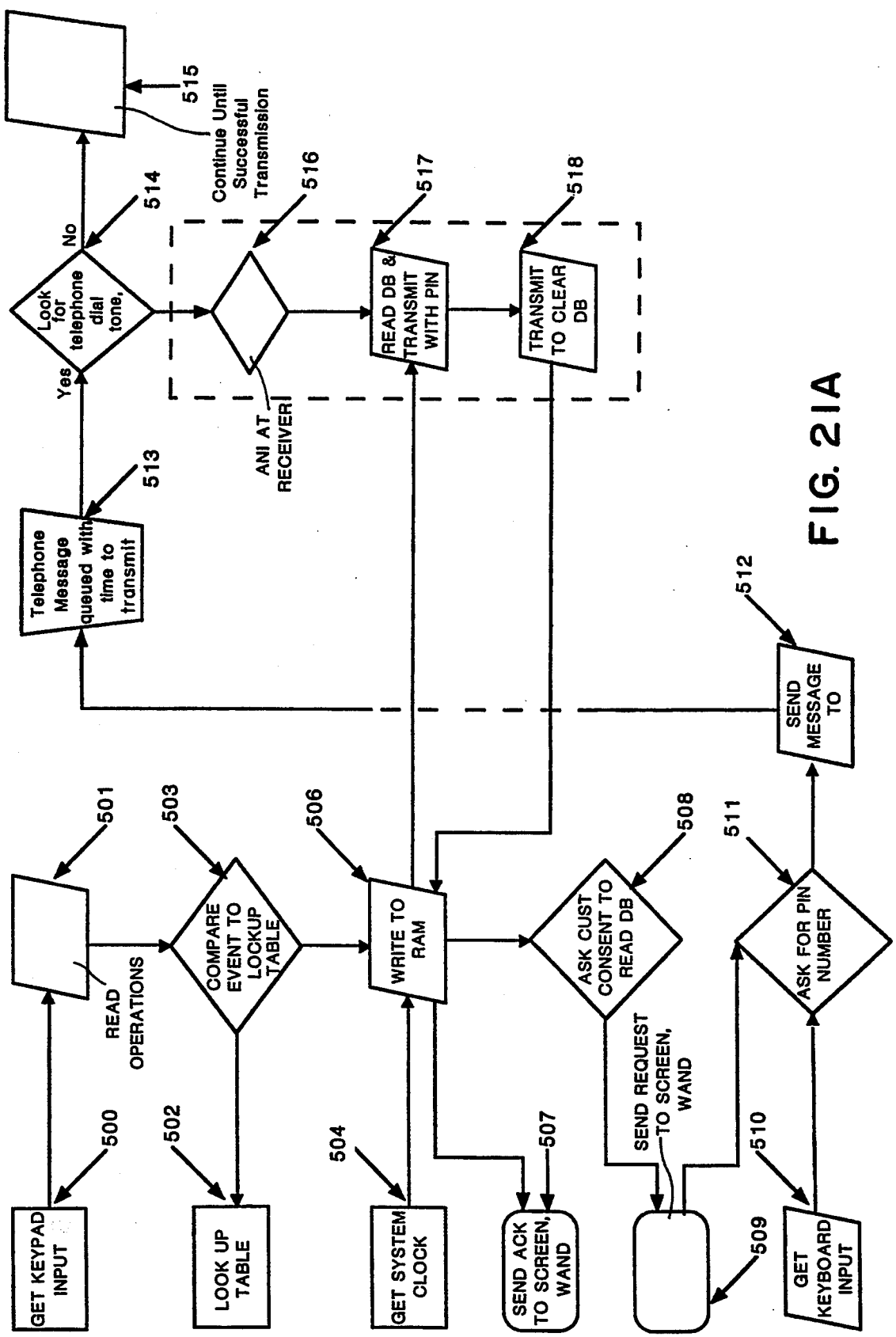
FIG. 21A illustrates the execution steps for the remote control device to create a saleable data base of viewing habits.

FIG. 21 illustrates the feature of the universal remote control which permits creation of a data base over a period of time which will include all activity and selection made using the universal remote control device. The foregoing device can, as has been explained, be used to select channels for viewing, channels and programs for recording, as well as ordering products and services offered for sale via the television broadcast community. Additionally, there is provided for the operation of various stereophonic equipment and channel selection of digital music broadcasts which have been made by the user over this time period.

The data base, comprising an event log for the universal remote control device, may have value to a marketing research company. At the user's selection, this information can be transferred to the marketing research company for a fee or other consideration arranged between the consumer and marketing research company. Thus, marketing research can identify the music tastes preferred by households within a region, ordering out habits, as well as other viewing habits and preferred entertainment features in a given locality.

Additional to recording selections made during the normal course of operating each of the remote controlled devices, an interactive capacity is included such that users of the remote control device may indicate preferences when viewing an advertisement or other inquiry initiated at the broadcast facility. When the program being watched or listed to in the case of a radio broadcast, indicates that users should indicate a selection or preference by operating the keypad on the universal remote control device, this preference or selection is an event to be recorded in the data base.

The selections made on the keypad input in 500 are effectively filtered by a look up table 502 which will eliminate for entry into the RAM inconsequential events such as volume settings, channel selections which are only brief and not indicative of any preference of the viewer. The look up table 502 will basically eliminate selections which are deemed to have no marketing use.

In step 503, those events which are not excluded by the look up table of 502 are written to the RAM 506 at a location within the RAM corresponding to the data base. It is helpful to observe that the data base may, in itself, be partitioned, such that channel selection for instance, would reside in its own data base so that only this information could be transferred to a market research company. Other portions of the data base may include the order out selections made over a given period of time by the user, and may include yet another portion for interactive responses to various broadcast inquiries.

Each event written to the data base 506 is time stamped from a system clock time 504.

The customer will be queried at 508 at intervals selected by the marketing research company to determine whether the customer is willing to have his data base transferred to the marketing research company. This request will be part of a program broadcast being viewed by the customer. In response to the advertisement being displayed, 509, if the customer consents to the data base transfer, the remote control device will capture embedded data associated with the broadcast and upon selection of an appropriate key on the keypad, the customer's authorization is recorded by the universal remote control device. The embedded data will also be captured by the customer's remote control device through the optical port or other port, as was explained with respect to previous Figures, and a transaction formulated according to FIG. 20 to transfer the data base to the marketing research company.

The embedded data will request that the user input through the keyboard 510 his pin number in step 511. The pin number will function as a control such that only the owner of the universal remote control device can authorize the data base transfer.

The embedded data capture and formulation of a telephone message for transmission to the marketing research company is carried out in accordance with FIG. 21B. The data base is transferred in 512 from the remote control to the telephone interface 25. The telephone message is cued in step 513 for transmission at a time identified in the embedded data.

The telephone interface 25 of FIG. 16 will establish a telephone connection through standard telephone network protocol in step 514. In the event a call cannot be successfully placed, the telephone interface 25 will continue for a period of time in step 515 to establish the call with the marketing research company.

Once a call has been placed to the marketing research company via the telephone interface, the marketing research company will, with automatic number identification in step 516, verify that the caller telephone number agrees with the transmitted telephone number contained in the message. The data base information will be read along with the pin 517 number appended to the message for record at the marketing research company.

Once the data base has been successfully downloaded to the market research company, a CLEAR signal is sent in 518 back to the telephone interface 25 of FIG. 16 to tear the call connection down and also to hear the contents of the data base memory in the remote control device.

Embedded Message Remote Control Device and Telephone Interface Protocol

Figure 22:
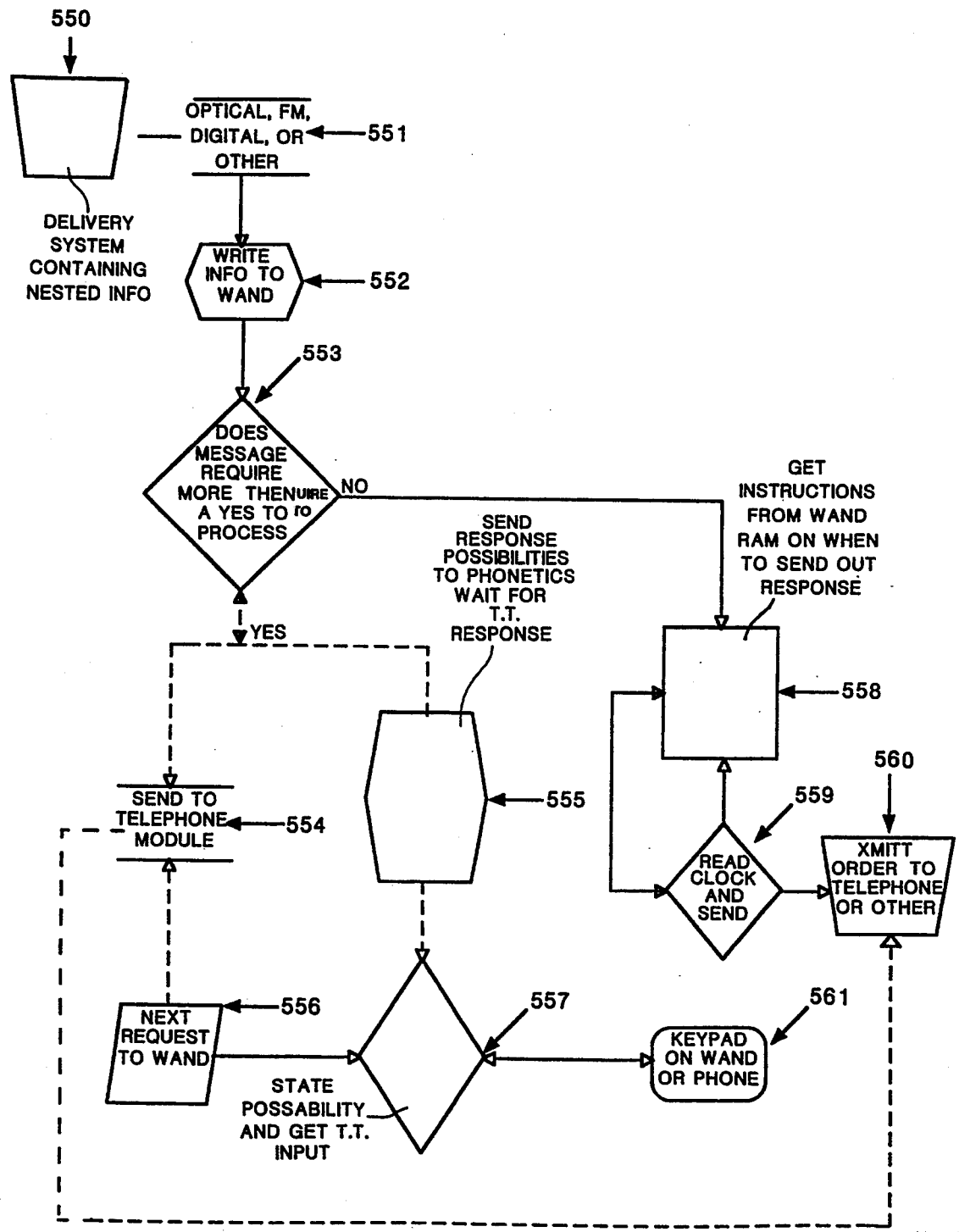
FIG. 22 illustrates the process for using embedded signal data for placing an order to a commercial vendor.

FIG. 22 illustrates an operational diagram of the process for placing an order from an embedded signal contained in a television broadcast. The process contemplates capturing the embedded signal in the remote control device and using the telephone interface to generate audio phonetic commands for instructing the user of the remote control device as to selections which must be made as part of the ordering process. The ordering process requires the user to compose a message which will ultimately be transferred to the sponsoring party as a request to purchase or complete some other transaction with the sponsoring party.

The remote control device has limited facilities for processing an audio message. That portion of the decoded message from the embedded signal containing audio information constituting a voice message for use is transferred to the telephone interface 25 via the bidirectional FM link. Once it is transferred, the telephone interface 25 will institute a bidirectional communication session with the remote control device so as to relay the message relating to the transaction to the user.

Figure 20:
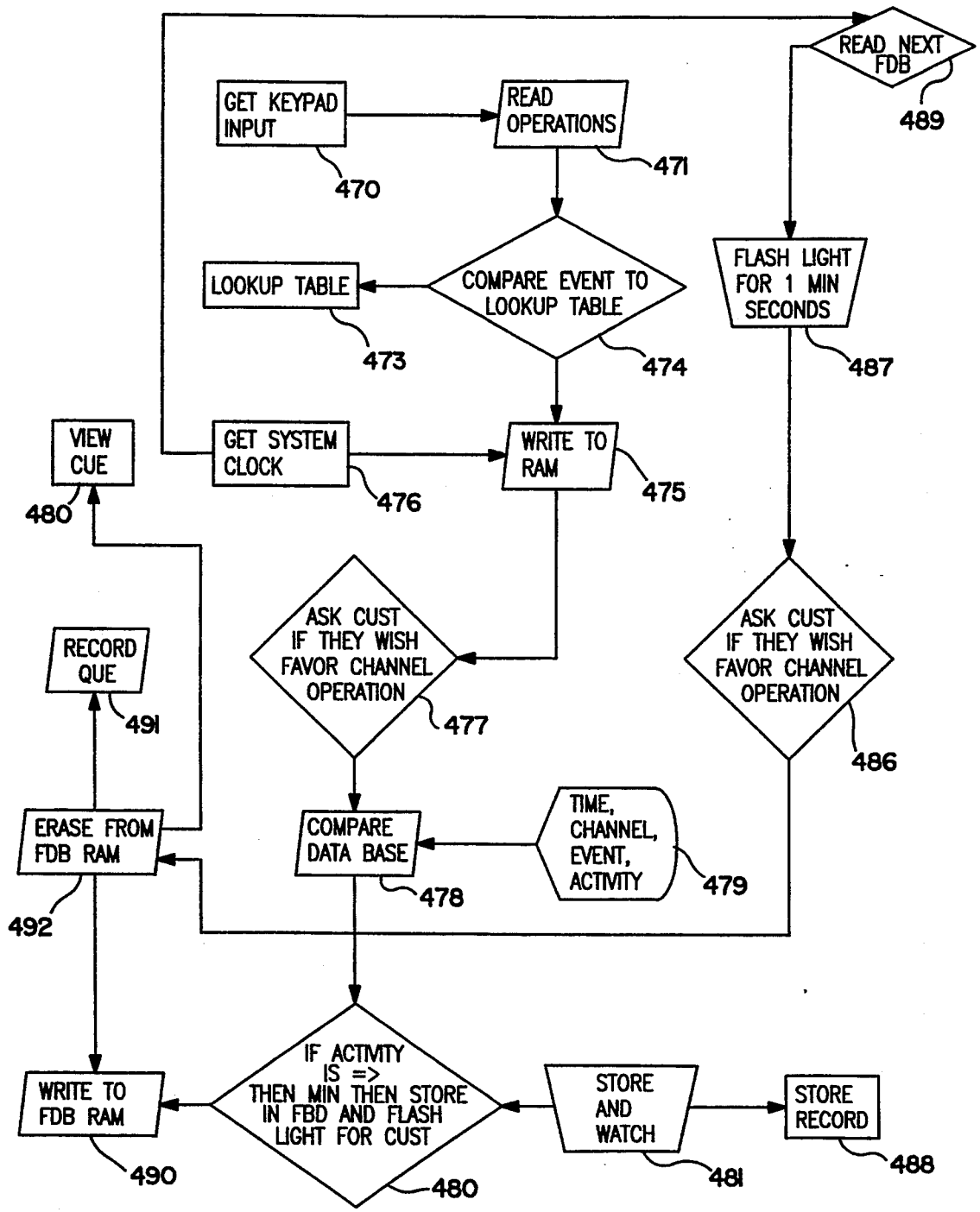
FIG. 20 illustrates the favored channel feature implemented by the remote control device for viewing and recording favorite channels on a program basis.

In block 550, the embedded signal containing information identifying the product being sponsored, the message ID and features of FIG. 20 are formed as a message embedded in the video signal.

Detection of the signal through the optical port or by other means 551, results in the message being written to the remote control device 552. The user may be required to make one or more choices to identify the nature of any product or service ordered. In decision block 553, a determination is made if more than one selection is needed. In some advertisements which are to be ordered via the information contained in the embedded message, only require one actuation of a control on the remote control device. The device will be able to forward to the telephone interface all necessary message components for calling the vendor via the telephone interface 25, providing all instructions to the vendor for purchase of the product.

Where more interaction is needed between the customer and vendor, such as selecting size, quantity, delivery dates, deliver means, etc., an interactive protocol is set up between the remote control device via the bidirectional FM link and the telephone interface 25. This interface will permit the voice messaging data received from the embedded signal to be decoded in the telephone interface 25, and signalled back over the bidirectional communication link to the remote control device. The phonetic voice messaging will be audible to the user of the remote control device via the sound generator of FIG. 10.

Voice menu selections transferred from the telephone interface 25 to the remote control device are received in 555 and result in a possibility being stated to the user via the sound generator. A key selection is made by the user in 561 in response to the audible menu selection, and the key response 557 is sent to the RAM of the remote control unit, as a character in a message field of a message being composed. This process is repeated by a request 556 for the next message cue from the telephone interface 25 until all menu selections have been made for the order being placed.

The remote control unit composes a complete transaction message including the dial digits obtained from the embedded signal for the sponsoring party, the identity of the message, all the selections made in response to the various audio cues, and a time for placing the transaction is obtained from the embedded signal. The composed message residing in the RAM of the remote control device is cued out in step 558 when the real clock 559 indicates that the real time corresponds to the time the transaction is to be placed. The entire message is then forwarded at 560 to the telephone interface 25 where the transaction may be completed.

The completion of this transaction as described with respect to FIG. 21B will include appending various data to the message relating to billing, delivery location, shipping method, etc. The completed transaction message is then executed by establishing a telephone call between the telephone interface 25 and the sponsoring party.

Referring to FIG. 21B, the process for providing interactive service between a broadcasting facility which is displaying an advertisement for goods and services, and a user's remote control device is shown. Further, FIG. 21B illustrates how a transaction may be initiated from the user's remote control device back to the offering party for the advertised product or service. The process begins with a header for messaging, initiated from the broadcast facility. The message can be either embedded in an image being displayed, as a luminance modulation of one or more lines of the image, or may be contained on a spare subcarrier or broadcast channel associated with the broadcasting facility. The encoded message is received in the television receiver as an encoded signal which is removed either at the set top converter in the case of a cable television facility, or if the message is optically encoded on a video signal, is displayed with the video signal on the consumer's television receiver. The embedded data signal contains all the information necessary for initiating a transaction with a sponsoring party, and is invisible to the viewer, but is detectable by the remote control device through the optical port 600. When the advertisement displays to the user that the message may be captured and an order placed in response to the message, the user will point the remote control optical port towards the television receiver. The message embedded with the video programming is captured in the remote control device random access memory 90 of FIG. 10.

The captured message includes the day of broadcast 603, the calendar month and weekday of the broadcast 604, the time of broadcast 605, the channel identifier 606, as well as a message ID 607. The message ID is unique to specific embedded messages which have been transmitted by the broadcast facility and captured by the remote control device.

The message may be transmitted either optically by modulating the luminance on an image being viewed, or may be a narrow bandwidth digital audio signal embedded in the program audio which is normally inaudible to the user 601. Other means for conveying the message include frequency modulation of a subcarrier associated with the broadcast 602.

The message may contain audio information as digitized data to be reproduced on the sound generator of the remote control device of FIG. 10. This possibility 611 by one field of the message which identifies the message as having either audio information or not having audio information for delivery to the remote control user via the phonetics generator.

Responses are made by the user by either selecting digits 613 using controls associated with the remote control device, or may be made by voice through the microphone 28 of the remote control device of FIG. 10. The voice response is digitized and forwarded to the sponsoring parties. In any event, the message received will inform the user by either the sound generator in the case of an audio message, or on an associated display for the remote control device instructions for responding to the advertisement being viewed. Alternatively, rather than embedding instructions for the user in the message itself, the advertisement may include instructions for the user to operate his keypad on the remote control device or provide a voice message through microphone 28 at a given time.

The information needed to be conveyed back to the vendor includes selection information relating to the quantity being ordered 614, the shipping method 615 and the method of payment 616. In some commodities, such as fast food purchases, directions 618 to the user's home would be available via the voice messaging capability 617. Upon a visual cue in the advertisement being watched, the user would supply a voice command, through the microphone 28, which would be digitized for transmission to the vendor.

The order-out feature of the present invention contemplates placing a call to the sponsoring party to complete a transaction for the advertised goods or services. The number to call 608 is shown, which includes dial digits 610 for placing the call from the consumer's home to the sponsoring party. A priority message 609 indicates the time of day such a call is to be made. For instance, fast-food purchases would require calls to be placed immediately, whereas other commodities may be ordered during the later part of the day when telephone traffic is minimal, long distance charges are minimal or for other reasons the call is to be placed at a later time.

Call information has now been received within the user's remote control, which is necessary for permitting the user to select and place an order for an advertised product or service. A digital data stream will be configured within the remote control device for transmission to the sponsoring party to place an order selected by the user, in accordance with the various cues which may be displayed in the advertisement.

The composed message characterizing the homeowner's selection is represented in either blocks 627 through 632 or blocks 633 through 637. As the message conveyed to the sponsoring party may be either digitized voice 627 or digital data 633 for decoding and display at the sponsoring party's location the identical information is contained in a message stream for to each of these messaging formats.

Information which must also accompany the customer's order selection include billing information as well as a pin number 641 to control use of the ordering system to only authorize personnel within the household. Thus, children not having access to the pin number would not be able to place an order without the cooperation of a pin-holder.

The remote control device of FIG. 10, when initialized, includes data identifying the user's credit card 638 billing address 639, as well as the telephone number 640 from which the order will be placed. Thus, the sponsoring party may verify the legitimacy of the order by comparing the address associated with the credit card with the address appended to the credit card number 638 to verify delivery to the correct address. Further, a phone number 640 appended to the message will be compared at the sponsoring party's facility with ANI data derived from the placed phone call to be sure the transaction is being originated from its appropriate location. Additionally, the message pin number inserted by the user in 641 will be verified before the transaction is sent to the vendor. The pin number is additionally appended to the message for billing purposes at the vendors facility.

The remaining items shown in FIG. 21B which will be appended to the message transferred to the sponsoring party include an item number specific to the product being advertised. The item number 625 is obtained from the message ID 607 received from the inbound message. Further, the entire message ID is appended in 624 so that the sponsoring party can identify which message was seen by the viewer when multiple broadcasts of these advertisements are employed.

The day of the transaction 623, the date of the transaction 622 and the time of the transaction 621 are appended to the foregoing message and constitute the entire outgoing message 620.

The information represented in 624 through 621 will be useful in the event the television program was recorded on the user's VCR, and then played back at a later time. The vendor will thus be able to control and monitor orders which are placed outside of any time window associated with the offering.

The message so-formulated is now ready for transmission to the telephone interface represented in FIG. 16. The telephone interface represented in FIG. 16 could be placed at the user's home as a wall-mounted device connected to the local area telephone network. Messages received from the remote control device of FIG. 10 would be received via the FM bidirectional communications link between FIG. 16 and the remote control device of FIG. 10.

As a first control feature of the device, the pin number appended to the message being received is compared with a prestored pin number of the battery-backed microprocessed RAM 214. As will be evident during the discussion of the procedures for registering each of the telephone interfaces with respect to a central authority, the pin number 641 is appended to the unique identification number of the telephone interface 25. Assuming that the pin numbers correspond, a call will be placed via the modem 216 over the RJ11 200 interface. The telephone call so placed, results in using standard telephone data communication protocol, transferring the composed order message to the sponsoring party's facility.

The message obtained at the sponsoring party's facility is analyzed, interrogated and responded to in accordance with the steps 642 through 650. The touch-tone interaction 642 permits the sponsoring party to signal the telephone interface 25 at the consumer's home for retransmission of the message in the event difficulty was experienced in securing a noise-free message for decoding. A replace message request 643 permits the entire message to be transferred to the sponsoring party's facility in its entirety. Segments of the received message represented by the credit and balance portion 644, pin number 645, permit portions of the message to be replayed to sponsoring party. If the ANI determination is determined to be questionable, the sponsoring party can request in 646 that the call be replaced.

Other possibilities include a pause 647 for inhibiting the message from being processed. Further, a play function 648 will reinitiate play of the message following a pause interval.

Having thus decoded and processed the entire message, the message is to be cleared in 649 at the initiation of the sponsoring party to terminate the telephone call in 650. The clear message command is sent as an instruction back to the telephone interface 123 of the consumer's home, indicating the message has been received and processed and may be deleted from its message cue.

Figure 23A:
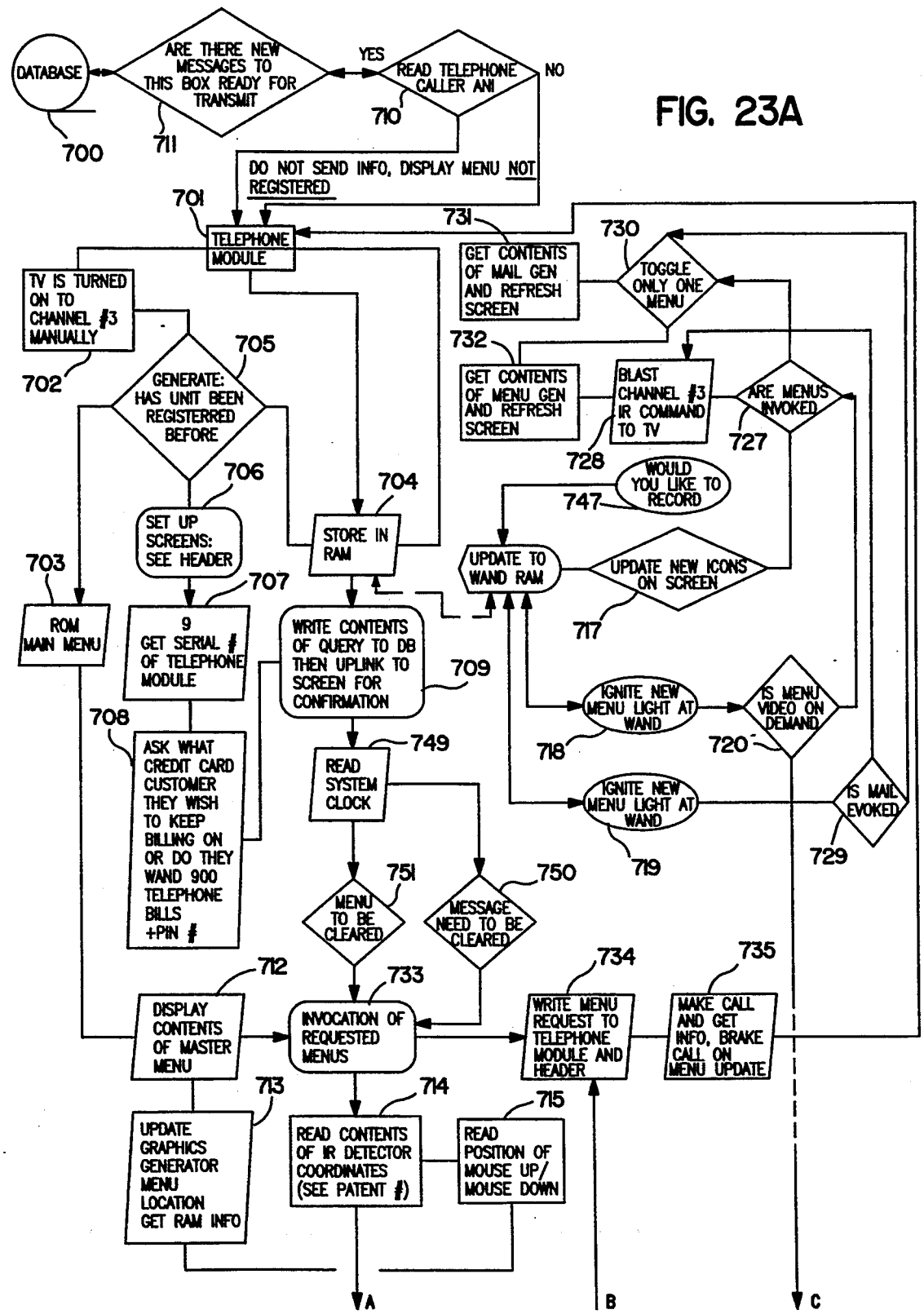
FIG. 23A describes the process for transferring television display menus for a telephone line to a telephone interface.
Figure 23B:
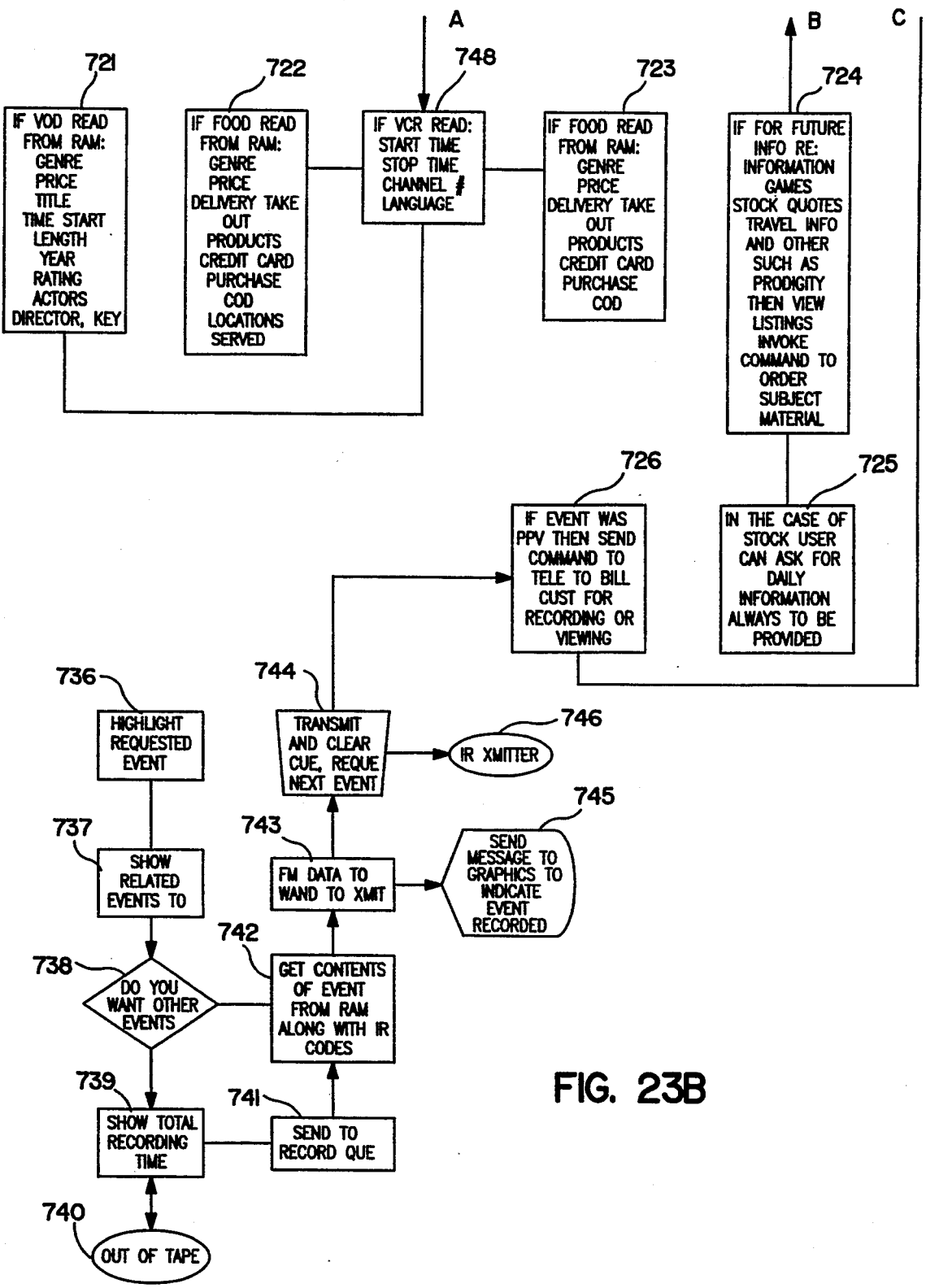
FIG. 23B illustrates the process of formulating a transmission at the remote control device and forwarding it via the telephone interface to a vendor.

Referring to FIGS. 23A and 23B, there is shown a programming sequence for permitting television menus to be delivered via data base 700 to the telephone module 25, over a local area network telephone line. The steps represented in the Figure are used to program a menu service so that various menus can be displayed to the user on the television receiver, indicating selections which are capable of being made.

The transfer of the various menus from the data base 700 occurs after an initialization routine has been effected. Upon installation of the telephone interface 25, the user enters a simple execution routine for initializing the telephone interface to receive current menus for display on the television receiver, as well as permit various reporting functions to be carried out and billing functions for the use of these menus.

Initially, the unit is installed and power applied. In step 702, the user must turn the television receiver to channel 3 so that it can view menus being modulated on channel 3 by the telephone interface 25. The telephone module 701 will communicate between the telephone interface 25 and the data base 700.

Before communication takes place, a local menu is generated and displayed to the user via channel 3. The local initial menu comes from a ROM main menu 703, and is displayed to the user. Since the unit has not been previously initialized, various requests are made of the user to enter data pertaining to billing functions and user ID functions. By examining the contents of the RAM in step 704, decision block 705 will determine that the unit is virgin, i.e., has not yet been initialized. The initial screens 706 inform the user to obtain the requisite information for initializing the telephone interface. In step 707, the serial number of a telephone module is called for. In step 708, the menu displayed requests credit card information for billing purposes or perhaps provides an option to have all bills done via a 900 telephone number. A pin number is also requested from the user in step 708.

The user, in response to these queries, will insert the information in step 709. This information enters the telephone interface via a keypad on the remote control device which will generate, the DTMF tones necessary to indicate the written data to the RAM in step 704 has now composed as a message for transmission back to the data base 700. The transmission will indicate to the data base 700 all pertinent information for billing, which will authorize the data base 700 to commence a data transfer for various menus to the user.

The process of menu transfer begins by having the telephone interface in step 701 place an outgoing telephone call to the data base 700. The number is dialed and various DTMF digits generated for establishing the phone connection with data base 700.

The data base 700, upon sensing ringing digits, goes OFF HOOK, and an ANI process is performed to verify the caller's ID. The data base 700 will verify the detected ANI 710 calling number with respect to a calling number indicated in the message it composed at the telephone interface. When these numbers are found to be identical, the data base may commence its data transfer.

The various menus are sent via high-speed modem over the telephone line and, in accordance with the apparatus of FIG. 16, are decoded and stored in the RAM 704. These menus comprise menus for channel selection, ordering out various services and goods. The content of the menus are not limited and may include any type of commercial transactions which the user might be willing to pay for. Other possibilities include stock exchange reports, various data reports, weather reports and services which can be ordered by the user, using the call-out feature of the remote control device.

Having now initialized the RAM with the menus for display via the video generator of FIG. 16, the device can be considered programmed and ready for operation. The process following initialization includes a requirement that the customer select the menus of interest. In step 712, the menu display for a master menu is shown on channel 3. The user selects from the master menu the various types of menus he wishes to receive and display on his television receiver.

The user is permitted to move the cursor via the remote control device to the selection of interest. The video character generator within the telephone interface will decode the position of the cursor and note a selection made for each position of the cursor.

The process of selecting menus for downloading to the user continues until the user has decided all pertinent menus have been noted. Following the user's selection, a call must be placed back to the data base 700 to permit the loading sequence to begin.

The process of selecting a menu for the user is represented in steps 713, 714 and 715. In step 713, the graphic generator menu cursor location is updated in response to commands received from the remote control device. The position of the cursor is read in step 714, and a location is noted in step 715 when the user makes a positive selection by pressing one of the keypad function keys to note the particular selection data associated with the cursor position.

At this point, a message is composed in the RAM 704 indicating all menu selections which are to be downloaded to the user. The composed message forms the basis for a telephone message transfer. Given the fact that the initial request will probably be lengthy, the telephone module, based on the size of the message composed in the RAM 704, will wait for the late evening before placing the call and otherwise tying up the consumer's telephone line.

At the appropriate time the call is made back to the data base 700, and using the verification techniques referred to above with respect to ANI verification, the menu selections are retrieved from the data base 700 and forwarded via the high speed modem to the telephone interface 25. The retrieval process would also include transferring in 711 any messages or mail which have been compiled at the data base for the particular user. The received menus are decoded and entered in the RAM in step 704.

When data has been loaded from the data base 700 through the high speed modem to the RAM 704, it is desirable to notify the user of the presence of the new menu or message data for display. The universal remote control device is signalled in RAM 716 to display an icon which will remind the user that the requested menus have been uploaded as well as any messages which may have been appended to the menus for display. The step 717 occurs following initialization so that an appropriate icon will be available in the universal remote control device RAM for display on the device in these circumstances.

The user in steps 718 and 719, by pressing the appropriate icon, call for either a display of the menu information which has been received or a display of mail which may have been received, appended to the menus. By touching the appropriate icon representing these two conditions, commands are sent to display either the menu information or mail information.

One particular type of menu which may have been transferred to the user is a video-on-demand menu. The video-on-demand menu 721 will indicate whether the program is to be watched or recorded. The user is directed to select a particular function on the remote control device to effect either watching or recording of events contained in a video-on-demand menu. In the event that programs are to be watched on a video-on-demand menu, the command is given in step 720 to invoke the video-on-demand menu. When these menus are invoked, there is an infrared command sent to tune the channel to channel 3 on the television receiver via 728. The contents of the video-on-demand memory are displayed in 721 such that selections for viewing may be made directly therefrom by moving the cursor as previously explained. A cursor located on a given selection of a video-on-demand menu will identify the channel and when selected, by highlighting the selection, commands are sent to the television tuning system to select. Additionally, once a selection has been made, the cue is loaded with information reflecting the user's choice in step 726. This will form the basis for a billing transaction.

A similar routine is effected if mail is sent by the data base to the RAM 716 appended to any menu request. A light or icon of the universal remote control is illuminated in 719, indicating that such mail is present. When the user presses the appropriate icon, the mail routine is invoked in step 729 and the channel number 3 is tuned on the television receiver in step 728. In this case, mail contents are retrieved in step 731 for review by the user. A toggle control 730 will discriminate between requests for viewing mail and requests for viewing downloaded menus.

The menus and mail may have only a finite amount of time in which to be displayed as the advertiser may wish to expunge messages sent to the user after a given amount of time. Thus, in order to remove an advertisement of a product which may only be good for a certain period of time, it is necessary to make sure the advertisement is discontinued following the expiration date. Further, in the event users are charged a fee for the menus, it may be appropriate to clear the menus periodically, and reload menus to the system to just purge non-paying users periodically. In this situation, a system clock in 749 is read and decisions are made in decision blocks 750 and 751 to remove messages and menus on some periodic basis.

As each of the menus provided to the user contains a link to data for performing a function associated with that menu, i.e., if a channel broadcast is selected, the date, time of viewing, channel number is all needed to effect the selection, or in the case of an order out request, the identity of the product ordered, the vendor, and other purchasing transaction data must be compiled for a later message. This link to data will appear in RAM in locations identified as 721, 722, 723 and 724. Thus, any of the selections made from a menu will require reference to the linked RAM locations identified by 721–724.

As a different category of menu which is available to the user, 712 represents a request for information relating to features and information which can change, either daily or at some other frequent interval. When this information is requested in 712, a request is written to the RAM 704 to execute a communication session with the data base 700 at periodic intervals so that information is updated automatically, and at a selected interval. 724 represents a special case wherein the user can ask for such services as stock quotations, that daily information always be provided.

Block 734 represents the process of compiling a telephone transaction in response to a menu selection. When it is necessary to call back to the data base 700, the process flows through block 734 to compile a message which will include the dialed digits for the data base 700, data for transmission over the high speed modem, which identifies menu requests made by the user or specific information selected by the user for transfer from the data base 900 to the user. Block 735 executes the various requests which have been placed in cue for telephone access to the data base 700.

As a final necessary step in using the system of FIG. 16, when programs are to be recorded from a given menu selection, certain billing steps must be taken and initialization of the video recording device, as well as the television tuning system, is required.

The block labelled 736 represents the beginning portion of the selection of a program from a video menu for recording. When the selection is made in 736, block 747 will generate an indication to the user on the remote control device that the program is recordable. Related selections which are subject matter-wise related to a particular selection made in 736, are displayed in a sub-menu. Looking at the sub-menu 737, the user can make additional selections after responding to the query of 738, displayed on the television receiver.

The total number of selections are identified and a composite recording time is calculated in 739, such as to inform the user of the amount of tape required to record all these selections. An out of tape indication is represented in 740, such that as these times elapse relating to the programs to be recorded, and out of tape icon may be lit for the user's information.

The compiled list of program selections for recording is sent to a record cue in 741. Each of the entries in the record cue 741 has corresponding data associated therewith, i.e., record time, stop time and various IR codes necessary to program the VCR to record this selection. This related data is accessed in 742 and transmitted via the bidirectional FM communications link in 743 to the universal remote control device.

As a user-programmable menu, step 745 illustrates the possibility of having a menu displayed on the television receiver to indicate that one or more recordings have been made in accordance with programming contained in the record cue 741. This will apprise the user of the availability of these recorded events, as well as the need to change tapes and insure that the remaining recording selections in the cue 741 are taped.

Each time a program is to be recorded, the pertinent information from the event RAM obtained in 742 are transmitted to the remote control device in 746. Each event to be recorded subsequently produces from 746 IR commands for the universal remote control device.

Additionally, 744 will send the transaction data to the telephone interface to prepare a billing transaction. The billing transaction as represented in 726 is a command to create a billing transaction which is sent via the telephone interface back to the data base 700. All the pertinent information regarding billing obtained during initialization forms part of this transaction for billing the user for each program recorded or watched.

What is claimed is:

1. A programmable universal remote control system for controlling a plurality of appliances comprising:

a converter for receiving multiple channel broadcasts from a television programming facility, and receiving a plurality of authorization commands from said television facility for operating said converter and said appliances; and, a remote control device connected via a communication link to said converter, said communication link transferring said commands to said remote control device, said remote control device including:

a microprocessor system for executing said commands;

a random access memory connected to said microprocessor system for storing commands received over said communications link;

a command selection device connected to said microprocessor system for selecting one of said commands for execution; and, means for applying control signals over said communications link to said converter authorizing said converter to receive a selected signal from said television programming facility in response to an execution of said selected commands.

2. The programmable universal remote control system of claim 1 wherein said remote control device includes infrared communication means for transmitting control signals to said plurality of consumer appliances.

3. The programmable universal remote control system of claim 2 wherein commands for operating said consumer appliances are generated from operating codes received from said television programming facility via said converter and said communications link.

4. The programmable universal remote control system of claim 1 further comprising:

means connected to said converter and to a local telephone line for placing a call over said local telephone line; and, means for initiating said call in response to a command selected by said command selection device.

5. The programmable universal remote control system of claim 4 wherein said converter includes means for generating messages for transmission over a telephone link established by said means for placing a call.

6. The programmable universal remote control system of claim 5 wherein said messages are a request to purchase a product.

7. A programmable universal remote control device for communicating with a converter comprising:

a bidirectional communications link for exchanging digital commands with said converter;

a microprocessor system for executing commands received from said converter and said bidirectional communication link representing a plurality of control functions;

a display device for displaying which commands have been received from said bidirectional link and are available for execution;

a command selection device connected to said microprocessor system for selecting one of said displayed commands for execution; and, means for sending control information to said converter in response to execution of a selected command for controlling said converter.

8. The programmable universal remote control device of claim 7 wherein said display device comprising a touch screen display which displays available commands as icons.

9. The programmable universal remote control device of claim 8 wherein said touch screen display includes said command selection device which selects a command in response to the touch of a displayed icon representing said command.

10. The programmable universal remote control device of claim 7 wherein said display device displays characters representing a message supplied by a head end facility via said cable television converter and said bidirectional communications link.

11. The programmable universal remote control device of claim 7 wherein said command selection device generates a plurality of menus which are sequentially presented on said display device to permit categories of commands to be selected.

12. The programmable universal remote control device of claim 7 wherein some of said commands are received from a television head end facility identify classes of programming channels which may be selected for viewing.

13. A programmable universal remote control device for controlling a plurality of appliances comprising:

a communications link for sending commands to said appliances;

a memory for storing a plurality of codes unique to each appliance to be controlled;

a selection device for selecting a command to be sent to one of said appliances via said communications link;

a microprocessor system connected to said memory, said selection device, and said communications link for receiving a selected command from said selection device and applying a corresponding command to said communications link derived from one of said codes; and, interface means connected to said microprocessor system for receiving said plurality of codes, whereby said microprocessor system can receive and store said codes in said memory.

14. The programmable universal remote control device of claim 13 further comprising a display for displaying a menu of selectable commands.

15. The programmable universal remote control device of claim 14 wherein said display and said selection device are implemented as a touch-sensitive screen which displays said menu of selectable commands, and senses the selection of a command in response to touching a representation of a command on said touch-sensitive screen.

16. The programmable universal remote control device of claim 15 wherein said displayed menu includes a plurality of icons representing said selectable commands, and said selection is made by touching an area of said touch-sensitive screen displaying an icon.

17. The programmable remote control device of claim 16 wherein said microprocessor system identifies a command selection in said records as a favorite selection, and displays an icon representing said favorite selection.

18. The remote control device of claim 13 wherein said microprocessor system stores a record of command selections which have been made.

19. The remote control device of claim 13 wherein said communications link includes an infrared light generator which is modulated by said commands.

20. The remote control device of claim 13 wherein said communications link is bidirectional and is connected to said interface means which receives said codes from said bidirectional link.

21. The programmable remote control device of claim 13 wherein said interface means is connectable to a telephone line and receives said codes from said telephone line.

* * * * *